US009669595B2

(12) United States Patent
Borchardt et al.

(10) Patent No.: US 9,669,595 B2
(45) Date of Patent: Jun. 6, 2017

(54) METHODS OF MAKING MULTI-LAYERED BAGS WITH ENHANCED PROPERTIES

(71) Applicant: The Glad Products Company, Oakland, CA (US)

(72) Inventors: Michael G. Borchardt, Willowbrook, IL (US); Shaun T. Broering, Fort Thomas, KY (US); Robert T. Dorsey, Willowbrook, IL (US); Donald E. Wogelius, Kennesaw, GA (US); Jason R. Maxwell, Willowbrook, IL (US); Scott W. Binger, Bridgeview, IL (US)

(73) Assignee: The Glad Products Company, Oakland, CA (US)

( * ) Notice: Subject to any disclaimer, the term of this patent is extended or adjusted under 35 U.S.C. 154(b) by 371 days.

(21) Appl. No.: 14/481,623

(22) Filed: Sep. 9, 2014

(65) Prior Publication Data
US 2014/0378286 A1 Dec. 25, 2014

Related U.S. Application Data

(63) Continuation-in-part of application No. 13/299,177, filed on Nov. 17, 2011, now Pat. No. 9,186,862, (Continued)

(51) Int. Cl.
*B31B 19/64* (2006.01)
*B31B 1/26* (2006.01)
(Continued)

(52) U.S. Cl.
CPC ............. *B31B 19/64* (2013.01); *B30B 11/18* (2013.01); *B31B 1/26* (2013.01); *B32B 3/266* (2013.01); *B32B 3/28* (2013.01); *B32B 7/045* (2013.01); *B32B 7/12* (2013.01); *B32B 27/08* (2013.01); *B32B 27/16* (2013.01); *B32B 27/20* (2013.01); *B32B 27/30* (2013.01); *B32B 27/32* (2013.01); *B32B 2270/00* (2013.01); (Continued)

(58) Field of Classification Search
CPC .................................. B31B 19/64; B31B 1/26
See application file for complete search history.

(56) References Cited

U.S. PATENT DOCUMENTS 4,273,549 A * 6/1981 Pezzana ................... B25H 3/04
383/37
7,132,151 B2 * 11/2006 Rasmussen ............... B32B 3/28
156/205

(Continued)

*Primary Examiner* — Daniel Lee
(74) *Attorney, Agent, or Firm* — Thomas C. Feix

(57) ABSTRACT

Methods for creating multi-layered incrementally-stretched and incrementally-laminated bags with increased or maintained strength are described herein. An increased level of strength is achieved by bonding adjacent layers of a multi-layer film together in a manner that the bond strength of the laminated layers is less than a strength of a weakest tear resistance of the individual first and second film layers. The inventors have surprisingly found that such a configuration of light bonding provides increased and unexpected strength properties to the multi-layer film as compared to a monolayer film of equal thickness or a multi-layer film in which the plurality of layers are tightly bonded together.

20 Claims, 24 Drawing Sheets

Related U.S. Application Data which is a continuation-in-part of application No. 12/947,025, filed on Nov. 16, 2010, now Pat. No. 8,603,609, application No. 14/481,623, filed on Sep. 9, 2014, which is a continuation-in-part of application No. PCT/US2014/024431, filed on Mar. 12, 2014.

(60) Provisional application No. 61/261,673, filed on Nov. 16, 2009, provisional application No. 61/779,877, filed on Mar. 13, 2013.

(51) Int. Cl.

| | | |
|---|---|---|
| *B32B 7/04* | (2006.01) | |
| *B32B 27/08* | (2006.01) | |
| *B30B 11/18* | (2006.01) | |
| *B32B 7/12* | (2006.01) | |
| *B32B 27/16* | (2006.01) | |
| *B32B 27/20* | (2006.01) | |
| *B32B 27/30* | (2006.01) | |
| *B32B 27/32* | (2006.01) | |
| *B32B 3/26* | (2006.01) | |
| *B32B 3/28* | (2006.01) | |

(52) U.S. Cl.
CPC ..... *B32B 2307/51* (2013.01); *B32B 2307/518* (2013.01); *B32B 2307/558* (2013.01); *B32B 2307/5825* (2013.01); *B32B 2307/746* (2013.01); *B32B 2439/46* (2013.01); *B32B 2555/02* (2013.01)

(56) References Cited

U.S. PATENT DOCUMENTS

| | | |
|---|---|---|
| 7,901,758 B2 | 3/2011 | Rasmussen |
| 8,263,210 B2 | 9/2012 | Rasmussen |
| 8,309,206 B2 | 11/2012 | Rasmussen |
| 8,557,364 B2 | 10/2013 | Rasmussen |
| 2006/0093766 A1* | 5/2006 | Savicki .................. B29C 59/04 428/35.2 |

* cited by examiner

METHODS OF MAKING MULTI-LAYERED BAGS WITH ENHANCED PROPERTIES

CROSS-REFERENCE TO RELATED APPLICATIONS

The present application is a continuation in part of U.S. patent application Ser. No. 13/299,177 filed Nov. 17, 2011 and entitled MULTI-LAYERED LIGHTLY-LAMINATED FILMS AND METHODS OF MAKING THE SAME, which is a continuation in part of U.S. patent application Ser. No. 12/947,025 filed Nov. 16, 2010 and entitled DISCONTINUOUSLY LAMINATED FILM and issued on Dec. 10, 2013 as U.S. Pat. No. 8,603,609, which claims the benefit of and priority to U.S. Provisional Application No. 61/261,673, filed Nov. 16, 2009. The present application is also a continuation in part of International Patent Application No. PCT/US 14/24431 filed Mar. 12, 2014 and entitled STOCK ROLLS CONTAINING A FIRST FOLDED FILM WITHIN A SECOND FOLDED FILM AND METHODS OF MAKING THE SAME, which claims the benefit of and priority to U.S. Provisional Application No. 61/779,877, filed Mar. 13, 2013. Each of the above-referenced patents and applications is hereby incorporated by reference in its entirety.

BACKGROUND OF THE INVENTION

1. The Field of the Invention

The present invention relates generally to thermoplastic films and bags. Specifically, the invention relates to methods of making multi-layered thermoplastic bags with enhanced properties.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, and/or impact resistance of a thermoplastic film.

Co-extruded films are a common type of film used in many thermoplastic products. Commonly, co-extruded films include a core layer sandwiched between outer skin-layers. The core layer is commonly the thickest layer and provides the foundation for the film. The outer skin layers are often tailored to provide desired properties. To help ensure adequate film strength, conventionally strong lamination strength is provided between the layers of co-extruded films to help avoid delamination. In many instances, manufacturers use a tie layer or other adhesive layer to ensure adequate lamination strength between layers. Poorly laminated films are often avoided because the can have unacceptable properties.

The cost to produce products including thermoplastic film is directly related to the cost of the thermoplastic film. Recently the cost of thermoplastic materials has risen. In response, many manufacturers attempt to control manufacturing costs by decreasing the amount of thermoplastic material in a given product.

One way manufacturers may attempt to reduce production costs is to use thinner films, thereby reducing the amount of thermoplastic film needed to produce a product of a given size. Unfortunately, stretched or otherwise thinner thermoplastic films can have undesirable properties. For example, thinner thermoplastic films are typically weaker. As such, manufacturers may be dissuaded to use thinner films despite the potential material savings. This is particularly the case when strength is a desired feature in the product.

BRIEF SUMMARY OF THE INVENTION

Implementations of the present invention solve one or more of the foregoing or other problems in the art with apparatus and methods for creating multi-layered films and bags with enhanced properties. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

For example, one implementation of a thermoplastic bag with a bag-in-bag configuration includes a first thermoplastic bag and a second thermoplastic bag positioned within the first thermoplastic bag. A plurality of non-continuous bonded regions or bonds secure at least one of the respective bottom sections, middle sections, or upper sections of the first thermoplastic bag and the second thermoplastic bag together.

Another implementation of the present invention includes a multi-layered bag comprising a first sidewall comprising a first layer of a thermoplastic material and an adjacent second layer of thermoplastic material. The multi-layered bag also includes a second sidewall comprising a first layer of a thermoplastic material and an adjacent second layer of thermoplastic material. The second sidewall is joined to the first sidewall along a first side edge, an opposing second side edge, and a bottom edge. At least a portion of the respective top edges of the first and second sidewalls can define an opening of the multi-layered bag. A first plurality of non-continuous bonds secures at least one section of the first and second layers of the first sidewall together. Additionally, a second plurality of non-continuous bonds (of a different type, pattern, shape, density) secures a section of the first and second layers of the first sidewall together.

In addition to the forgoing, a method for forming a discretely laminated, multi-layered thermoplastic bag may involve providing first and second thermoplastic films. The method can also involve non-continuously laminating a portion of the first thermoplastic film to the second thermoplastic film by a process selected from the group consisting of adhesive bonding, ultrasonic bonding, embossing, ring rolling, SELFing, and combinations thereof. Additionally, the method can involve joining at least two edges of the first thermoplastic film and the second thermoplastic film together to form a bag configuration.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
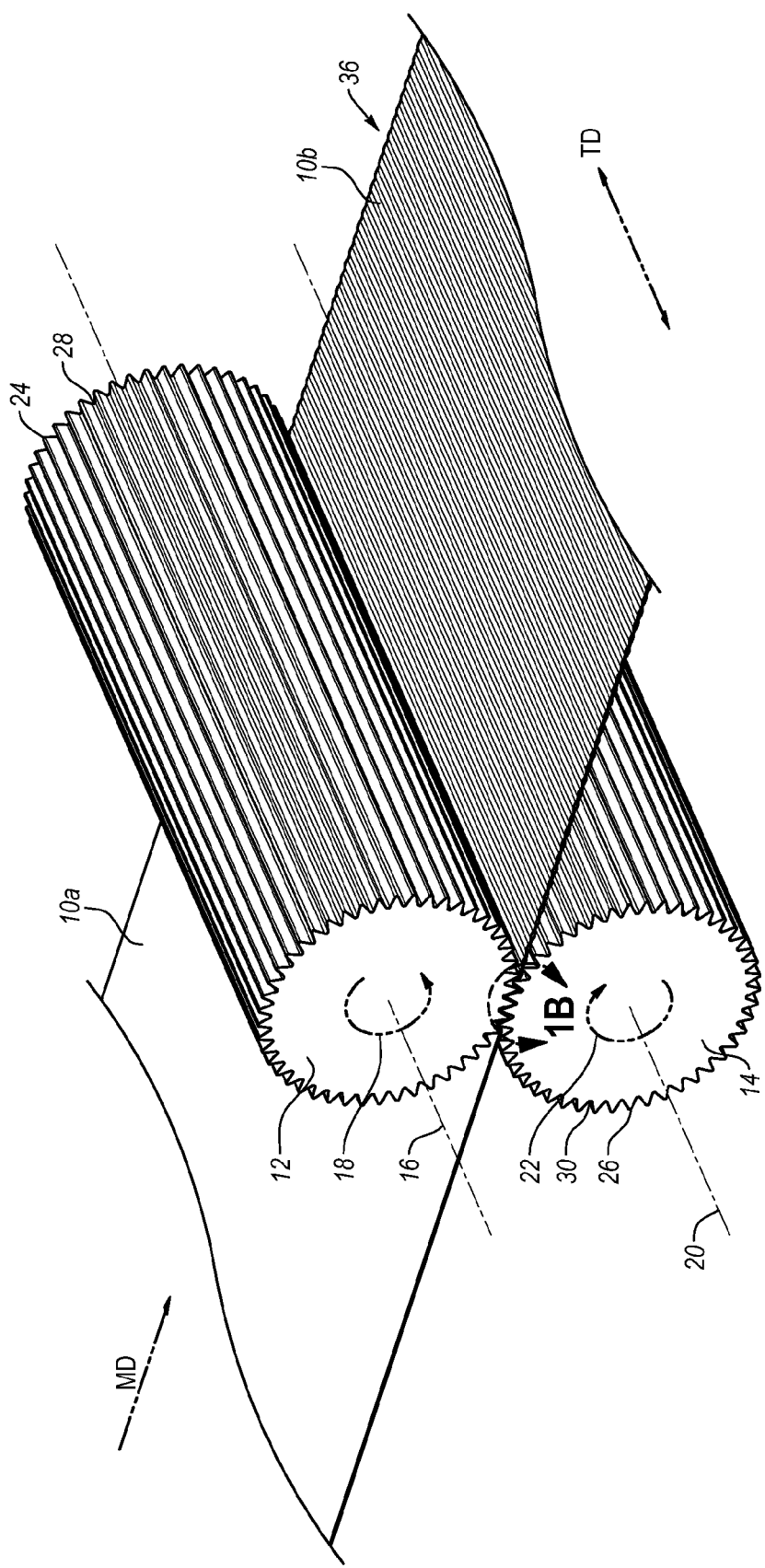
FIG. 1A illustrates a schematic diagram of two thermoplastic films being lightly laminated by MD intermeshing rollers in accordance with one or more implementations of the present invention.

One or more implementations of the present invention include apparatus and methods for creating multi-layered lightly-laminated films with increased strength. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

In particular, the light bonds or bond regions of adjacent layers of multi-layer films in accordance with one or more implementations can act to first absorb forces via breaking of the bonds prior to allowing that same force to cause failure of the individual layers of the multi-layer film. Such action can provide increased strength to the multi-layer film. In one or more implementations, the light bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the multi-layer film.

Thus, in one or more implementations, the light bonds or bond regions of a multi-layer film can fail before either of the individual layers undergoes molecular-level deformation. For example, an applied strain can pull the light bonds or bond regions apart prior to any molecular-level deformation (stretching, tearing, puncturing, etc.) of the individual film layers. In other words, the light bonds or bond regions can provide less resistive force to an applied strain than molecular-level deformation of any of the layers of the multi-layer film. The inventors have surprisingly found that such a configuration of light bonding can provide increased strength properties to the multi-layer film as compared to a monolayer film of equal thickness or a multi-layer film in which the plurality of layers are tightly bonded together (e.g., coextruded).

One or more implementations of the present invention provide for tailoring the bonds or bond regions between layers of a multi-layer film to ensure light bonding and associated increased strength. For example, one or more implementations include modifying or tailoring one or more of a bond strength, bond density, bond pattern, or bond size between adjacent layers of a multi-layer film to deliver a film with strength characteristics better than or equal to the sum of the strength characteristics of the individual layers. Such bond tailoring can allow for multi-layer films at a lower basis weight (amount of raw material) to perform the same as or better than higher basis weight mono-layer or co-extruded films.

Relatively weak bonding of the two or more layers of the multi-layer film can be accomplished through one or more suitable techniques. For example, bonding may be achieved by pressure (for example MD ring rolling, TD ring rolling, DD ring rolling, stainable network lamination, or embossing), or with a combination of heat and pressure. Alternately, ultrasonic bonding can lightly laminate the film layers. Alternately or additionally, adhesives can laminate the films. Treatment with a Corona discharge can enhance any of the above methods. Prior to lamination, the separate layers can be flat film or can be subject to separate processes, such as stretching, slitting, coating and printing, and corona treatment.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present invention, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the film, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

The individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

In one or more implementations, the light lamination or bonding between layers of a multi-layer film may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity.

In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "starting gauge" or "initial gauge" refers to the average distance between the major surfaces of a film before it is incrementally stretched so as to discontinuously bond adjacent layers together. Of course, it is also possible to stretch one or more of the individual layers before they are discontinuously bonded together.

Methods of providing relatively weak bonding of adjacent layers (i.e., so that the bond strength is less than a weakest tear resistance of the individual layers) can include many techniques, such as adhesive bonding, pressure bonding, ultrasonic bonding, and corona lamination. MD ring rolling, TD ring rolling, or other ring rolling processes (e.g., DD ring rolling or ring rolling that results in a thermoplastic film with strainable networks), and combinations thereof may be used to non-continuously bond adjacent layers of the multilayer film, as will be described in further detail below.

Film Materials

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof.

In at least one implementation of the present invention, the film can include linear low density polyethylene. The term "linear low density polyethylene" (LLDPE) as used herein is defined to mean a copolymer of ethylene and a minor amount of an alkene containing 4 to 10 carbon atoms, having a density of from about 0.910 to about 0.926 g/cm$^3$, and a melt index (MI) of from about 0.5 to about 10. For example, one or more implementations of the present invention can use an octene co-monomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

One will appreciate in light of the disclosure herein that manufacturers may form the individual films or webs to be non-continuously bonded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films. In any case, the resulting film will be discontinuously bonded to another film at a later stage to provide the benefits associated with the present invention.

Alternative to conventional flat extrusion or cast extrusion processes, a manufacturer can form the films using other suitable processes, such as, a blown film process to produce monolayer, bilayer, or multilayered films, which are subsequently discontinuously bonded with another film layer at a later stage. If desired for a given end use, the manufacturer can orient the films by trapped bubble, tenterframe, or other suitable processes. Additionally, the manufacturer can optionally anneal the films.

The extruder used can be of a conventional design using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

Figure 1B:
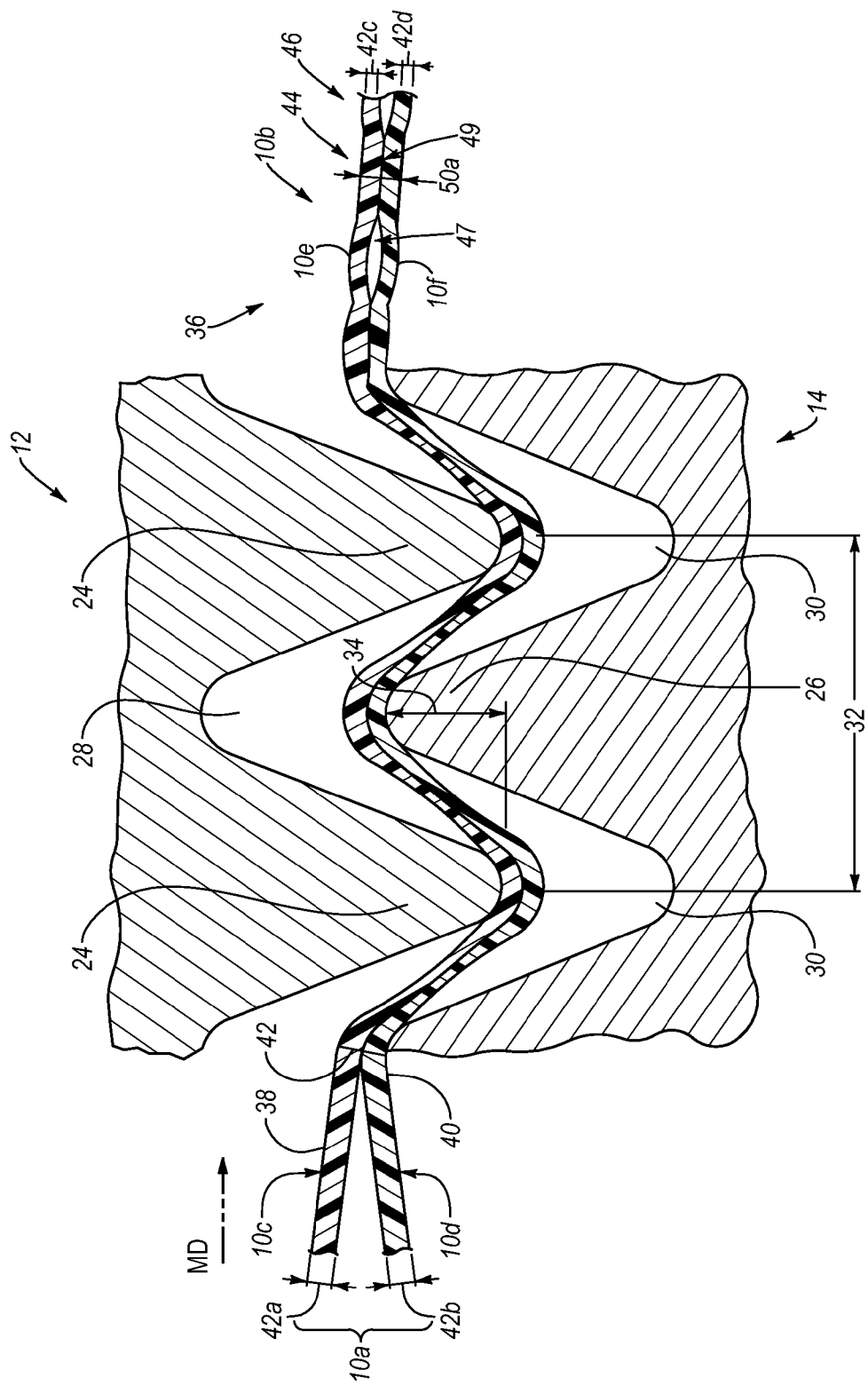
FIG. 1B illustrates an enlarged view of the two thermoplastic films passing together through the intermeshing rollers of FIG. 1A taken along the circle 1B of FIG. 1A to form a multi-layered lightly-laminated.

As previously mentioned, according to one implementation of the invention, the separate layers of the multi-layer film are non-continuously, lightly bonded to one another. FIGS. 1A-1B illustrate exemplary processes of partially discontinuously bonding adjacent layers of a multi-layer thermoplastic film in accordance with an implementation of the present invention. In particular, FIGS. 1A-1B illustrate an MD ring rolling process that partially discontinuously laminates the individual adjacent layers of thermoplastic multi-layered film 10a by passing the multi-layered film 10a through a pair of MD intermeshing rollers 12, 14. As a result of MD ring rolling, the multi-layered film 10a is also intermittently stretched in the machine direction MD.

As shown by the FIGS. 1A-1B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite directions about parallel axes of rotation. For example, FIG. 1A illustrates that the first roller 12 can rotate about a first axis 16 of rotation in a counter-clockwise direction 18. FIG. 1A also illustrates that the second roller 14 can rotate about a second axis 20 of rotation in a clockwise direction 22. The axes of rotation 16, 20 can be parallel to the transverse direction TD and perpendicular to the machine direction MD.

The intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20 and perpendicular to the machine direction of the film 10a passing through the MD intermeshing rollers 12, 14. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A-1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12.

One will appreciate in light of the disclosure herein that the configuration of the ridges 24, 26 and grooves 28, 30 can prevent contact between ridges 24, 26 during intermeshing so that no rotational torque is transmitted during operation. Additionally, the configuration of the ridges 24, 26 and grooves 28, 30 can affect the amount of stretching and the bond strength resulting from partially discontinuous lamination as the film passes through MD intermeshing rollers 12, 14.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching and partially discontinuous lamination caused by the MD intermeshing rollers 12, 14. As shown by FIG. 1B, the pitch 32 is the distance between the tips of two adjacent ridges on the same roller. The "depth of engagement" ("DOE") 34 is the amount of overlap between ridges 24, 26 of the different MD intermeshing rollers 12, 14 during intermeshing.

The ratio of DOE 34 to pitch 32 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 1A, the direction of travel of the multi-layered film 10a through the MD intermeshing rollers 12, 14 is parallel to the machine direction and perpendicular to the transverse direction. As the thermoplastic multi-layered film 10a passes between the MD intermeshing rollers 12, 14, the ridges 24, 26 can incrementally stretch the multi-layered film 10a in the machine direction. In one or more implementations, stretching the multi-layered film 10a in the machine direction can reduce the gauge of the film and increase the length of the multi-layered film 10a. In other implementations, the multi-layered film 10a may rebound after stretching such that the gauge of the multi-layered film 10a is not decreased. Furthermore, in one or more implementations, stretching the film 10a in the machine direction can reduce the width of the multi-layered film 10a. For example, as the multi-layered film 10a is lengthened in the machine direction, the film's length can be reduced in the transverse direction.

In particular, as the multi-layered film 10a proceeds between the MD intermeshing rollers 12, 14, the ridges 24 of the first roller 12 can push the multi-layered film 10a into the grooves 30 of the second roller 14 and vice versa. The pulling of the multi-layered film 10a by the ridges 24, 26 can stretch the multi-layered film 10a. The MD intermeshing rollers 12, 14 may not stretch the multi-layered film 10a evenly along its length. Specifically, the MD intermeshing rollers 12, 14 can stretch the portions of the film 10a between the ridges 24, 26 more than the portions of the multi-layered film 10a that contact the ridges 24, 26. Thus, the MD intermeshing rollers 12, 14 can impart or form a generally striped pattern 36 into the multi-layered film 10a. As used herein, the terms "impart" and "form" refer to the creation of a desired structure or geometry in a film upon stretching the film that will at least partially retain the desired structure or geometry when the film is no longer subject to any strains or externally applied forces.

FIGS. 1A-1B illustrate that the starting or initial film 10a (i.e., the film that is yet to pass through the MD intermeshing rollers 12, 14) can have a substantially flat top surface 38 and substantially flat bottom surface 40. As seen in FIG. 1B, the multi-layer film 10a may comprise two layers 10c and 10d that are initially separate from one another. The film 10a can have an initial thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual layers 10c and 10d can be substantially uniform along the length of the multi-layer film 10a. Because the inner surfaces of each layer 10c and 10d are somewhat tacky, the layers become lightly bonded together as they are pulled through and stretched by MD intermeshing rollers 12, 14. Those areas that are un-stretched or stretched less become lightly bonded together.

In one or more implementations, the initial film 10a need not have an entirely flat top surface 38, but may be rough or uneven. Similarly, bottom surface 40 or the inner oriented surfaces of layers 10c and 10d of the film 10a can also be rough or uneven. Further, the starting gauge 42, 42a, and 42b need not be consistent or uniform throughout the entirety of pre-stretched film 10a. Thus, the starting gauge 42, 42a, and 42b can vary due to product design, manufacturing defects, tolerances, or other processing issues. According to one embodiment, the individual layers 10c and 10d may be pre-stretched (e.g., through MD ring rolling, TD ring rolling, etc.) before being positioned adjacent to the other layer (10d or 10c, respectively). Such pre-stretching of individual layers can result in a striped surface exhibiting an uneven top and bottom surface similar to that seen in FIG. 1A.

FIG. 1B illustrates that films 10a, can include two initially separate film layers 10c-10d. In an alternative implementation, the film 10a (and thus the resultant incrementally stretched film 10) can include three initially separate film layers: a middle film layer and two outer film layers. In other embodiments, more than 3 layers may be provided (four, five, six, or more partially discontinuously or discontinuously laminated layers).

As seen in FIG. 1A, upon stretching and partially discontinuously laminating the adjacent layers, the multi-layered lightly-laminated film 10b of can include a striped pattern 36. The striped pattern 36 can include alternating series of stretched (or more stretched) regions or thinner webs 46 adjacent to un-stretched regions (or less stretched) or thinner ribs 44. FIG. 1B illustrates that the MD intermeshing rollers 12, 14 can incrementally stretch and partially discontinuously bond films 10c, 10d to create multi-layered lightly-laminated multi-layer films 10b including bonded regions or bonds 49 and un-bonded regions 47. For example, FIG. 1B illustrates that the film layers 10e, 10f of the multi-layered lightly-laminated film 10b can be laminated together at the thicker ribs 44 while the stretched (i.e., thinner) regions 46 may not be laminated together.

In addition to any compositional differences between layers 10c, 10d of a given multi-layer film, the different film layers can have differing gauges or thicknesses. In one or more implementations, the film layers may be substantially equal to one another in thickness. For example, the inventors have found that the MD or TD tear resistance of the composite, multi-layer film is typically approximately equal to the lowest MD or TD tear value of the individual layers, absent any increase in tear resistance provided by light bonding. In other words, the weakest layer often determines the strength of the multi-layer film structure.

As shown by FIG. 1B the bonded regions 49 of the multi-layered lightly-laminated films 10b can have an average thickness or gauge 50a. The average gauge 50a can be approximately equal to the combined starting gauges 42a, 42b of the starting films. In the Figures, separation between the unbonded layers at unbounded regions 47 is exaggerated for purposes of clarity. In one or more implementations, the average gauge 50a can be less than the combined starting gauges 42a-42b. The films 10e, 10f of the un-bonded regions 47 can each have an average thickness or gauge 42c, 42d. In one or more implementations, the average gauges 42c, 42d are less than the starting gauges 42a, 42b. Although the un-stretched regions or thicker ribs 44 of the multi-layered lightly-laminated films may be stretched to a small degree by MD intermeshing rollers 12,14 (or stretched in a separate operation), the un-stretched regions or thicker ribs 44 may be stretched significantly less compared to the stretched regions 46.

In any event, FIGS. 1A-1B illustrate that MD intermeshing rollers 12, 14 can process the initially separately layered films into MD incrementally-stretched multi-layered lightly-laminated films 10b. As previously mentioned, the MD incrementally-stretched multi-layered lightly-laminated films 10b can include a striped pattern 36 where the bonding occurs along a continuous line or region along the width of the film 10b, parallel to the TD direction. The striped pattern 36 can include alternating series of un-bonded regions 47 and bonded regions 49. The bonded regions 49 can comprise bonds between un-stretched regions or thicker ribs 44 of the films 10e, 10f In other words, the bonds of the MD incrementally-stretched multi-layered lightly-laminated films 10b can be positioned directly between, be aligned with, and bond together un-stretched regions or thicker ribs 44. Along related lines, the un-bonded regions 47 can separate the stretched or thinner regions 46.

Figure 2:
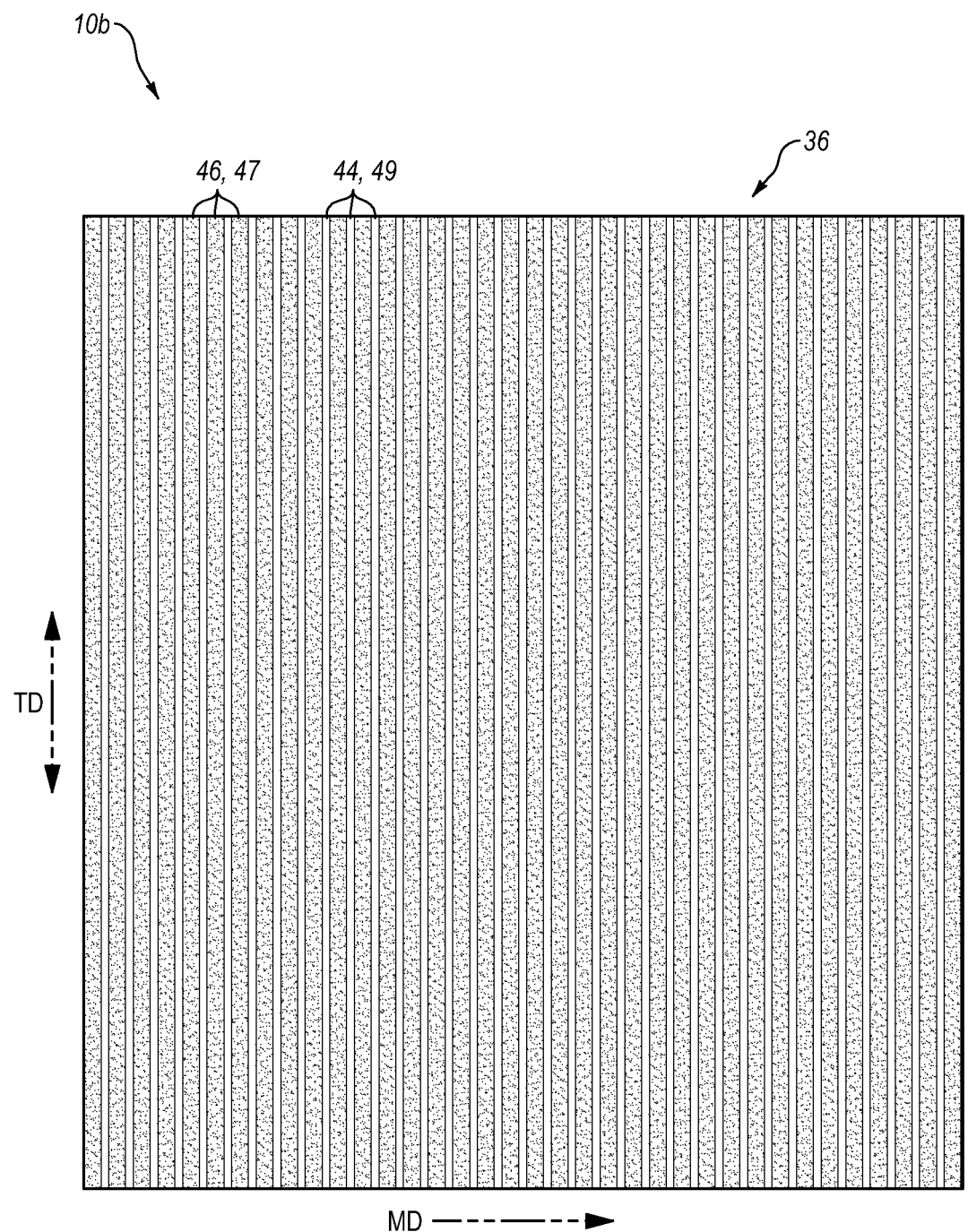
FIG. 2 illustrates a view of a multi-layered lightly-laminated thermoplastic film created by passing thermoplastic film through the intermeshing rollers of FIG. 1A.

FIG. 2 illustrates a top view of the MD incrementally-stretched multi-layered lightly-laminated film 10b. As shown by FIG. 2, the film 10b includes thicker ribs 44 bonded together to form bonded regions 49 adjacent to thinner regions 46 that form un-bonded regions 47. In addition to resulting in partially discontinuous lamination of adjacent layers, MD ring rolling the film 10a can increase or otherwise modify one or more of the tensile strength, tear resistance, impact resistance, or elasticity of the film 10b, in addition to whatever additional strength is provided by the partially discontinuous, low strength bonds between adjacent layers of the film. Such bonds can be broken to absorb forces rather than such forces resulting in tearing of the film.

Furthermore, thicker ribs 44 can include bonded stripes that extend across the film 10b in a direction transverse (i.e., transverse direction) to a direction in which the film was extruded (i.e., machine direction). As shown by FIG. 2, the bonded stripes or bonded regions 49 can extend across the entire length of the film 10b. One will appreciate in light of the disclosure herein that the striped pattern 36 may vary depending on the method used to incrementally stretch and partially discontinuously bond adjacent layers of film 10. To the extent that MD or other ring rolling is used to lightly bond the film 10, the striped pattern 36 (e.g., width and spacing of the stripes or stretched regions 44) on the film 10 can depend on the pitch 32 of the ridges 24, 26, the DOE 34, and other factors. As regions 49 represent areas of the multi-layer film in which the adjacent layers are lightly bonded to one another, it will be apparent that altering the spacing and/or width of regions 49 can affect the overall strength of the film. For example, providing more bonded surface area relative to the unbonded surface area can increase the density of such bonds that can absorb forces, increasing the film strength.

FIG. 2 further illustrates that the bonded regions 49 can be intermittently dispersed about un-bonded regions 47. In particular, each bonded region 49 can reside between adjacent un-bonded regions 47. Along related lines, each thicker rib 44 can be intermittently dispersed about stretched regions 46. Additionally, the bonded regions 49 and thicker ribs 44 can be visually distinct from the un-bonded regions 47 and thinner regions 46 as a result of stretching. The striped pattern 36 may vary depending on the method used to lightly laminate the film 10. In one or more implementations, the molecular structure of the thermoplastic material of the film multi-layered 10 may be rearranged during stretching (e.g., particularly so during cold stretching).

One will appreciate in light of the disclosure herein that passing the film 10a through the MD intermeshing rollers 12, 14 to form the MD incrementally-stretched multi-layered lightly-laminated film 10b can also modify the orientation of the film. In particular, MD stretching a predominately MD oriented film can further orient the stretched regions 46 in the machine direction. Thus, the stretched regions 46 can have an MD orientation that is greater than the MD orientation of the thicker ribs 44.

Figure 3A:
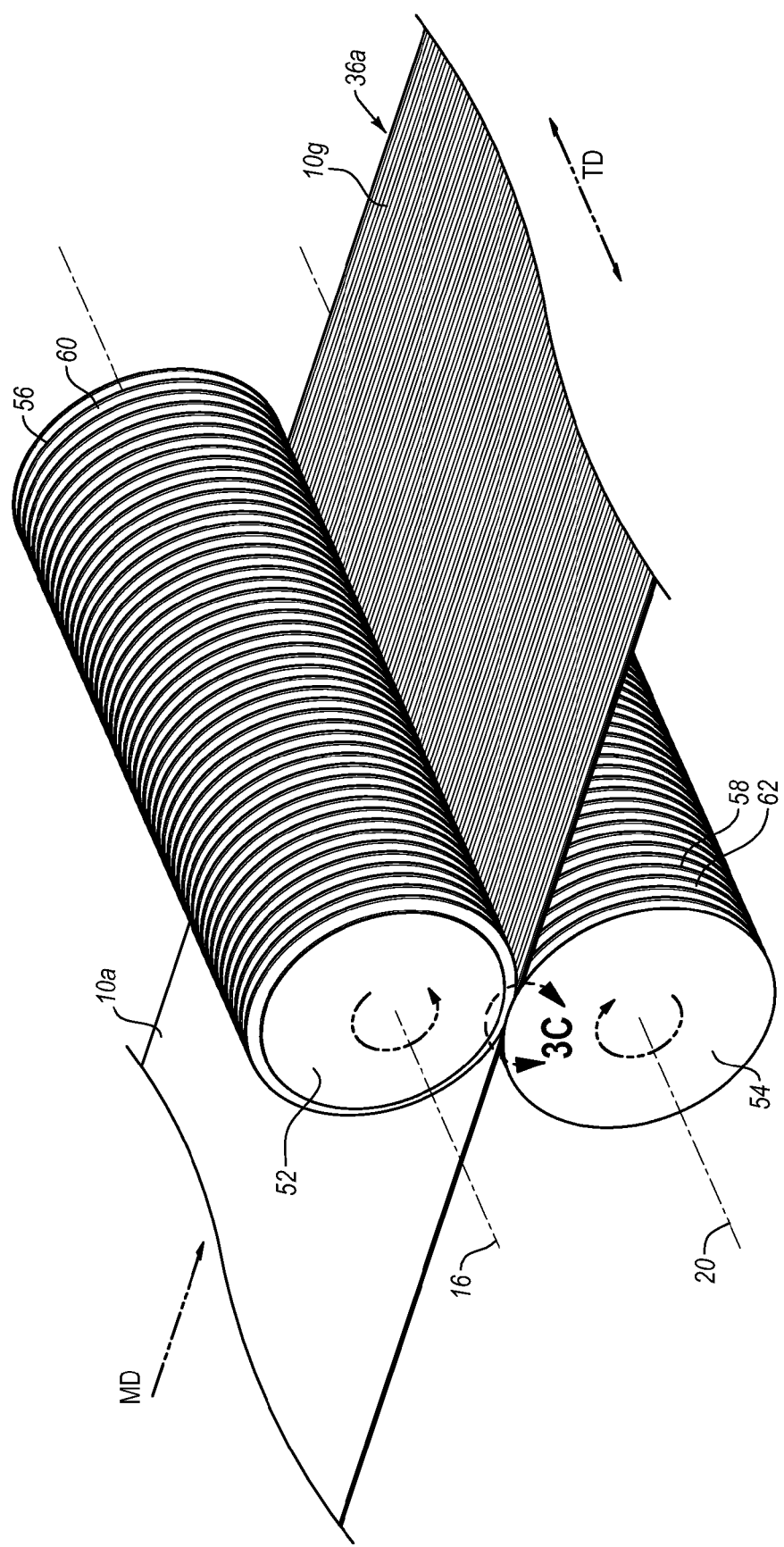
FIG. 3A a schematic diagram of two thermoplastic films being lightly laminated by TD intermeshing rollers in accordance with one or more implementations of the present invention.
Figure 3D:
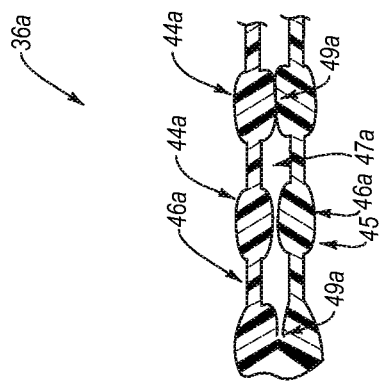
FIG. 3D illustrates an enlarged view of the multi-layer film after passing through the intermeshing rollers of FIG. 3A.
Figure 3C:
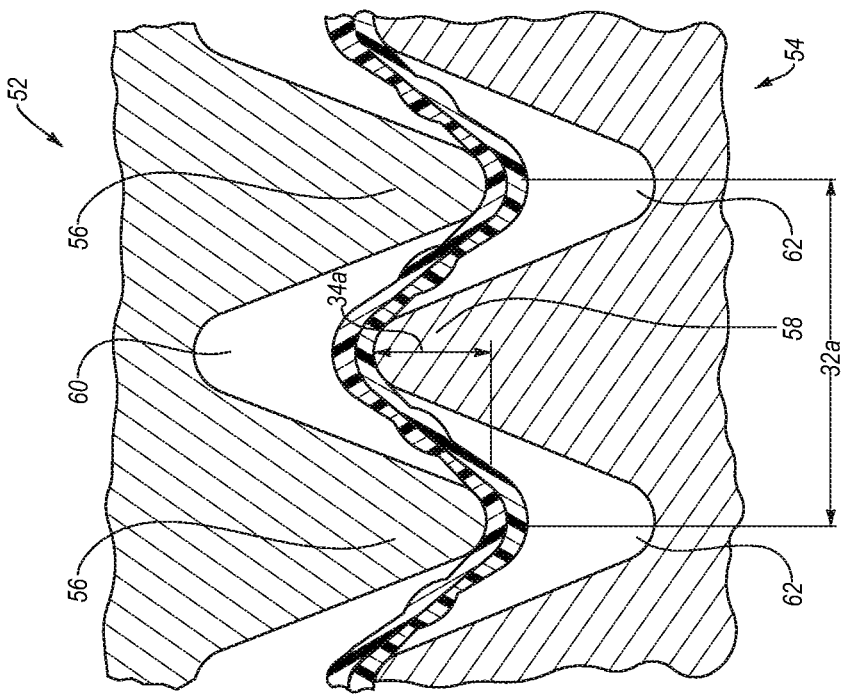
FIG. 3C illustrates an enlarged view of the films passing through the intermeshing rollers of FIG. 3A taken along the circle 3C of FIG. 3A.
Figure 3B:
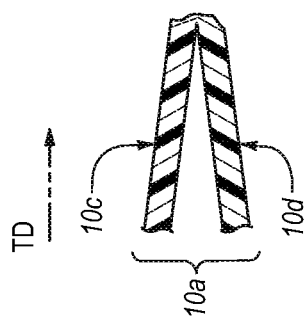
FIG. 3B illustrates an enlarged view of the films prior to passing through the intermeshing rollers of FIG. 3A.

MD ring rolling is one exemplary method of partially discontinuously laminating a multi-layer film by incremental stretching of the film. TD ring rolling is another suitable method of discontinuously or partially discontinuously laminating a film. For example, FIGS. 3A-3D illustrates a TD ring rolling process that partially discontinuously and lightly bonds adjacent layers of a thermoplastic multi-layer film by passing the film through a pair of TD intermeshing rollers 52, 54. In particular, FIG. 3B illustrates the thermoplastic multi-layer film prior to passing the film through the pair of TD intermeshing rollers 52, 54. FIG. 3C illustrates the thermoplastic multi-layer film prior as the film passes through the pair of TD intermeshing rollers 52, 54. FIG. 3D illustrates a resultant multi-layered lightly-laminated film created from the thermoplastic multi-layer film passing through the pair of TD intermeshing rollers 52, 54.

A TD ring rolling process (and associated TD intermeshing rollers 52, 54) can be similar to the MD ring rolling process (and associated MD intermeshing rollers 12, 14) described herein above, except that the ridges 56, 58 and grooves 60, 62 of the TD intermeshing rollers 52, 54 extend generally orthogonally to the axes of rotation 16, 20 (i.e., parallel to the MD direction). Thus, as shown by FIG. 3A, as the thermoplastic film 10a passes between the intermeshing rollers 52, 54, the ridges 56, 58 can incrementally stretch and lightly bond adjacent layers of the multi-layer film 10a. The resultant multi-layered lightly-laminated film 10g can include a striped pattern 36a within the with adjacent bonded and unbonded regions.

In particular, as the films 10c, 10d proceed between the TD intermeshing rollers 52, 54, the ridges 56 of the first roller 52 can push the films 10c, 10d into the grooves 62 of the second roller 54 and vice versa. The pulling of the films 10c, 10d by the ridges 56, 58 can stretch the films 10c, 10d. The rollers 52, 54 may not stretch the films 10c, 10d evenly along their length. Specifically, the rollers 52, 54 can stretch the portions of the films 10c, 10d between the ridges 56, 58 more than the portions of the films 10c, 10d that contact the ridges 56, 58, or vice versa. Thus, the rollers 52, 54 can impart or form a ribbed pattern 36a into resultant multi-layered film.

The TD intermeshing rollers 52, 54 can form thick regions or thicker ribs 44a, thinner webs 46a, and bonds 49a in the films 10c, 10d. In one or more implementations, the adjacent thick ribs 44a of the films 10c, 10d can be joined by bonds 49a. In addition to forming ribs 46a, 44a and bonds 49a, TD ring rolling the films 10c, 10d can increase or otherwise modify one or more of the tensile strength, tear resistance, impact resistance, or elasticity of the films 10c, 10d, in addition to whatever additional strength is provided by the partially discontinuous, bonds 49a between adjacent layers.

To the extent that TD or other ring rolling is used to lightly bond the films 10c, 10d, the ribbed pattern 36a (e.g., width and spacing of the ribs 46a, 44a) can depend on the pitch 32a of the ridges 56, 58, the DOE 34a, and other factors. As portions of the films 10c, 10d including a ribbed pattern 36a also represent areas of the multi-layer film in which the adjacent layers are non-continuously bonded to one another, it will be apparent that altering the spacing and/or width of ribs 46a, 44a can affect the overall strength of the film. For example, providing more bonded surface area relative to the unbonded surface area can increase the density of such bonds 49a that can absorb forces, increasing the film strength.

FIG. 3B further illustrates that the bonds 49a can bond thick linear ribs 44a of the layers 10a, 10d together. In particular, the bonds 49a can be coextensive and aligned with opposing thicker ribs 44a and bond them together. FIG. 3B illustrates that the bonds 49a can secure some, but not all, of the thick linear ribs 44a of one layer to the thick linear ribs 44a of an adjacent layer. In particular, FIG. 3B illustrates that bonds 49a can secure every other thick linear rib 44a of adjacent layers together. The unbounded thicker ribs 44a can form unbounded regions 45. In alternative implementations, bonds 49a can secure each thick linear rib 44a of adjacent layer together.

Figure 4:
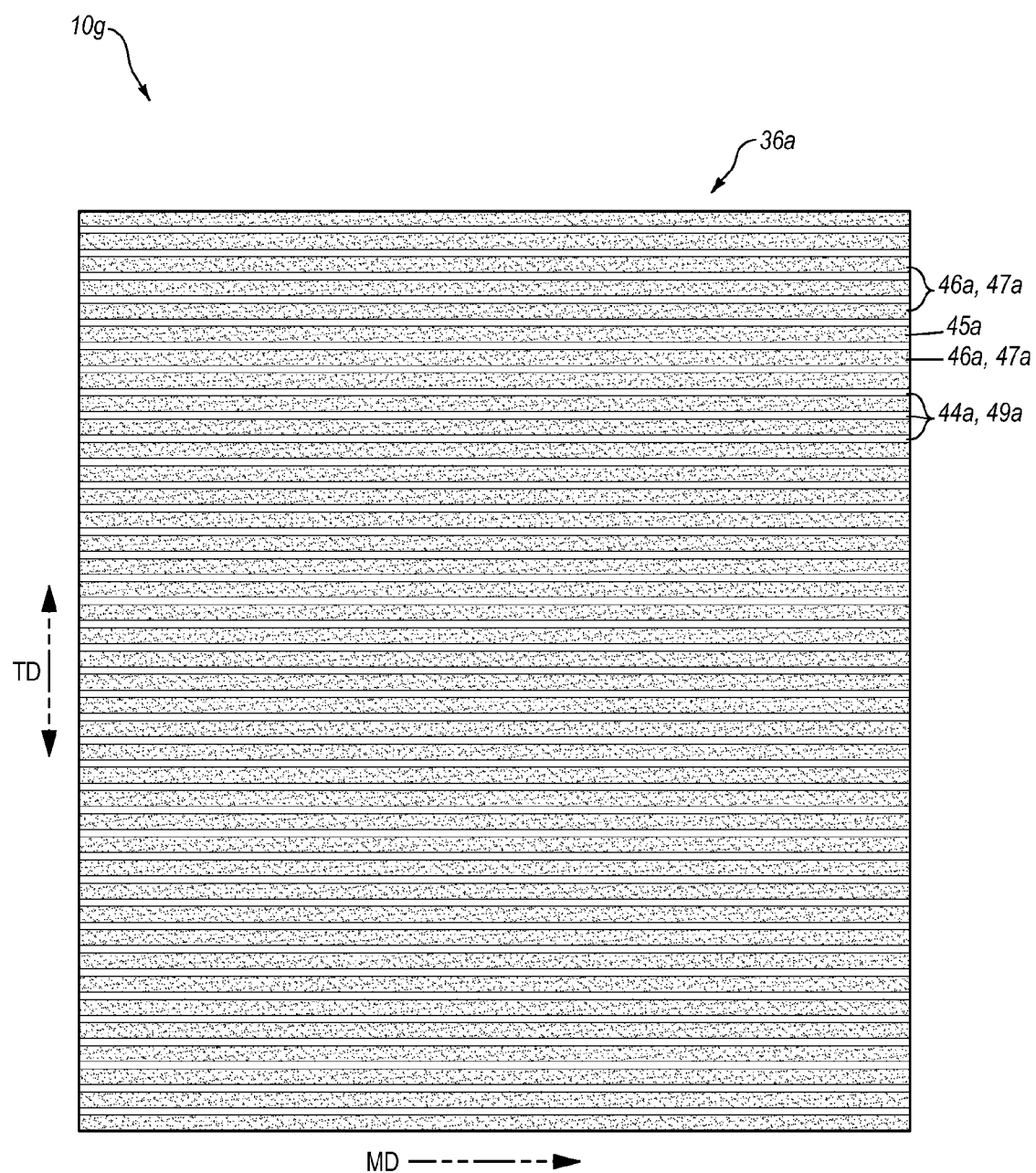
FIG. 4 illustrates a view of a multi-layered lightly-laminated thermoplastic film created by passing thermoplastic film through the intermeshing rollers of FIG. 3A.

FIG. 4 illustrates a view of the TD incrementally-stretched multi-layered lightly-laminated film 10g. As shown by FIG. 4, the film 10g includes thicker ribs 44a bonded together to form bonded regions 49a adjacent to thinner regions 46a that form un-bonded regions 47a with bonded regions 46a and adjacent un-bonded regions 44a. Similar to MD ring rolling, TD ring rolling the multi-layered film 10 can result in relatively light, partially discontinuous bonding of adjacent layers 10c, 10d, increasing the strength of the multi-layer film 10g.

FIG. 4 illustrates that the bonded regions 49a can include stripes that extend across the multi-layered lightly-laminated film 10g in the machine direction. As shown by FIG. 4, the stripes or bonded regions 49a can extend across the entire width of the multi-layered lightly-laminated film 10g. In alternative implementations, bonded regions 49a can extend across only a portion of the multi-layered lightly-laminated film 10g. Similar to MD ring rolling, the pitch and the DOE of the ridges 56, 58 of the intermeshing rollers 52, 54 can affect the width and spacing of the stripes or bonded regions 49a, as well as the strength of the light bonds formed between adjacent layers, thereby affecting the overall increase in strength provided by the processing.

Figure 5:
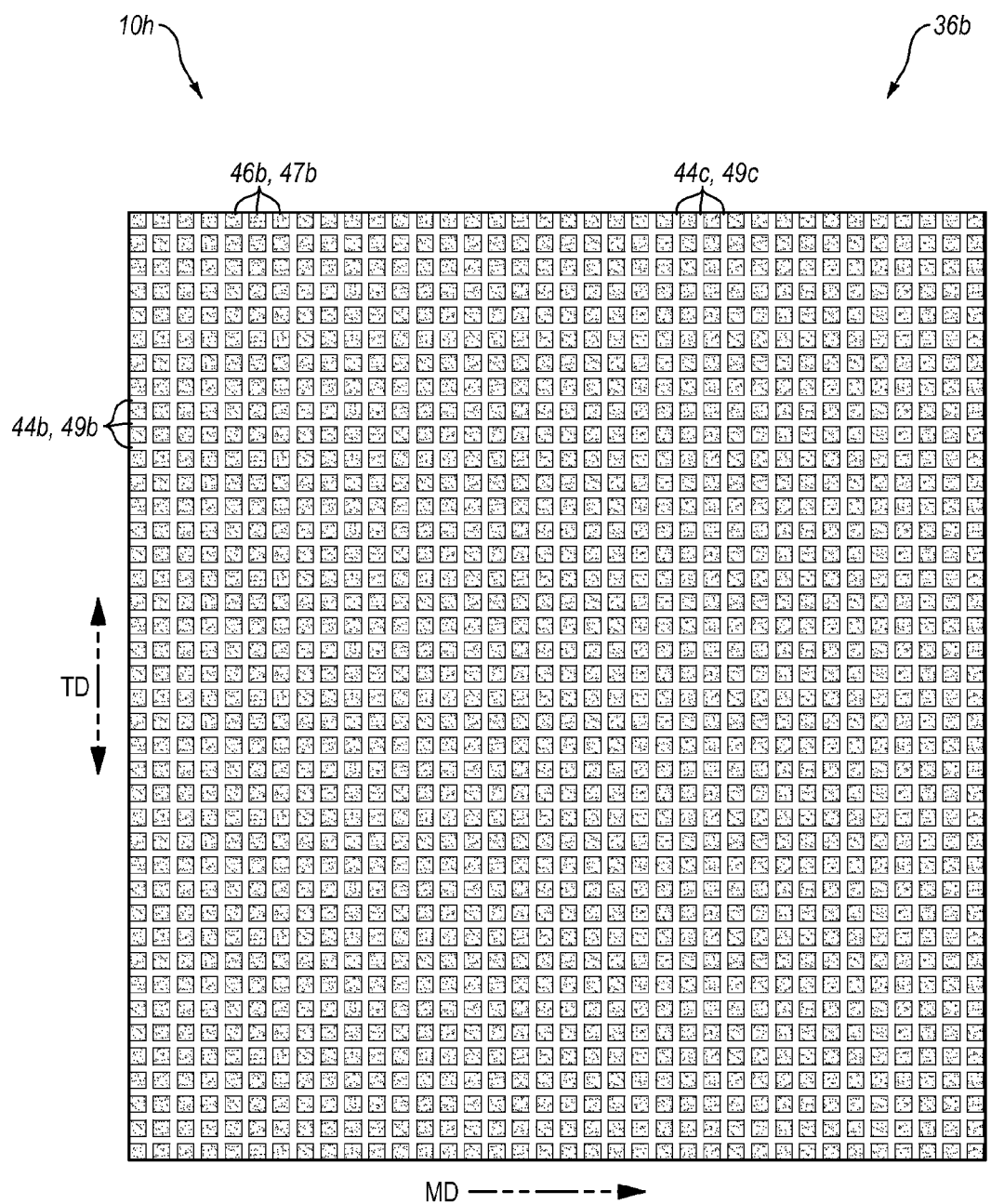
FIG. 5 illustrates a view of a multi-layered lightly-laminated thermoplastic film created by passing thermoplastic film through the intermeshing rollers of both FIG. 1A and FIG. 3A.

In still further implementations, a multi-layered film 10 can undergo both an MD ring rolling process and a TD ring rolling process to lightly bond the individual layers together. For example, FIG. 5 illustrates a top view of a multi-layered lightly-laminated film 10h. The film 10h includes thicker ribs 44b, 44c bonded together to form bonded regions 49b, 49c adjacent to thinner regions 46b that form un-bonded regions 47b. The multi-layered lightly-laminated film 10h can have a grid pattern 36b including alternating series of un-bonded regions 47b and bonded regions 49b, 49c. In particular, un-bonded regions 47b may comprise a plurality of discrete squares or rectangles while the remainder of the surface comprises a grid of horizontal and vertical bonded regions that are connected together. The bonded regions 49b, 49c can include stripes 49b that extend along the multi-layered lightly-laminated film 10h in the machine direction, and stripes 49c that extend along the film in the transverse direction, which cross each other. As shown by FIG. 5, in one or more implementations, the aspect ratio of the rows and columns of the bonded regions 49b, 49c can be approximately 1 to 1. In alternative implementations, the aspect ratio of the rows and columns of -bonded regions 49b, 49c can be greater or less than 1 to 1, for example, as explained in greater detail in relation to FIG. 13.

The multi-layered lightly-laminated film 10h with bonded regions and adjacent un-bonded regions created by MD and TD ring rolling can allow for greater material savings by further increasing the surface area of a given portion of film, by increasing the density of light lamination bonds within a given area, and may also provide properties or advantages not obtained by MD or TD ring rolling alone.

Figure 6:
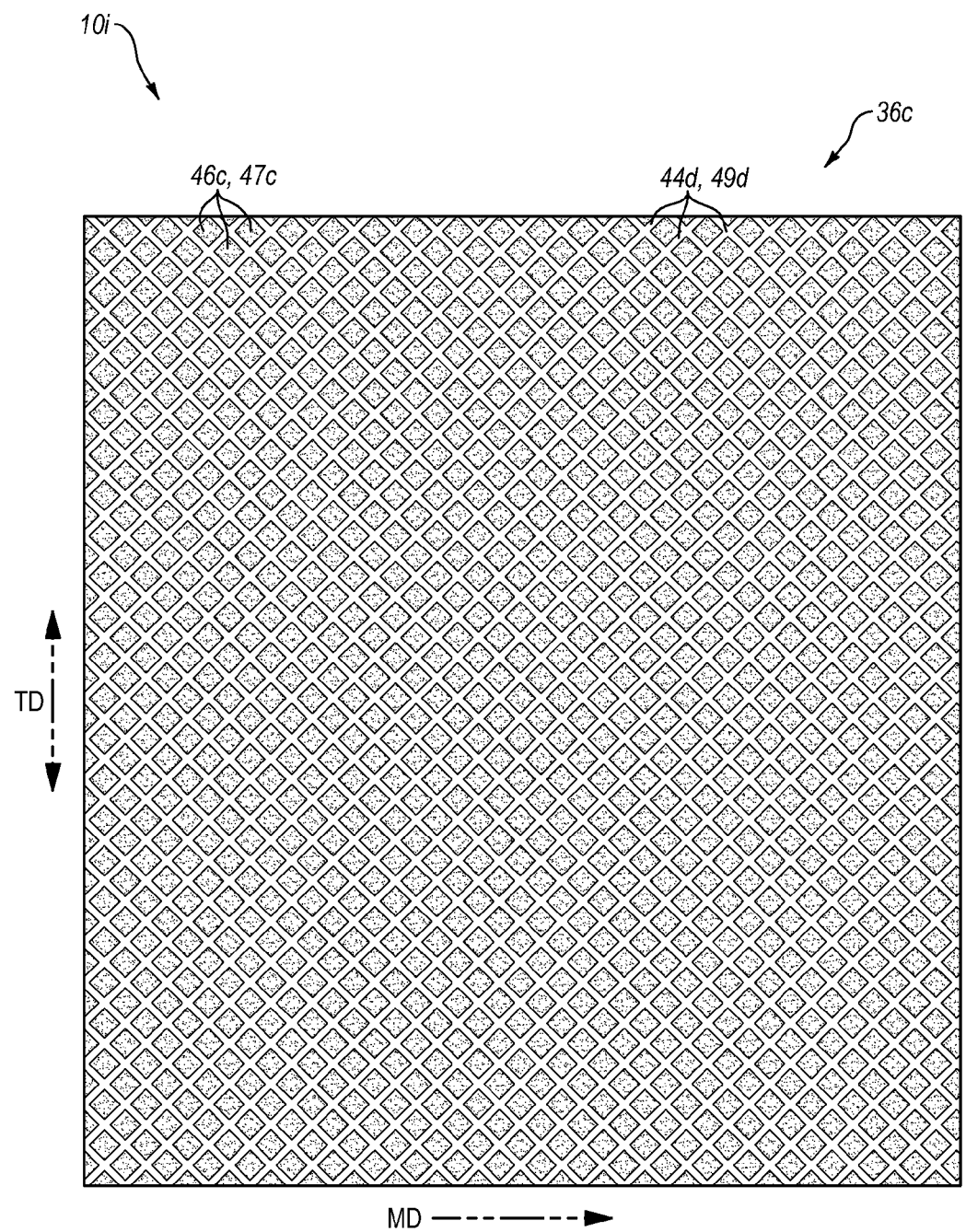
FIG. 6 illustrates a view of a multi-layered lightly-laminated thermoplastic film created by passing thermoplastic film through diagonal direction intermeshing rollers in accordance with one or more implementations of the present invention.

In yet further implementations, a manufacturer can use diagonal or helical (DD) ring rolling to lightly bond a thermoplastic film. DD ring rolling processes (and associated DD intermeshing rollers) can be similar to the MD ring rolling process (and associated MD intermeshing rollers 12, 14) described herein above, except that the ridges and grooves of the DD intermeshing rollers can extend at an angle relative to the axes of rotation. In particular, the ridges and grooves of the DD ring rollers can extend at an angle of between about 15 degrees and about 75 degrees relative to the axes of rotation (or the MD or TD directions). FIG. 6 illustrates a multi-layered lightly-laminated film 10i formed by lightly bonding two films together by passing the films through DD ring rollers. As shown the multi-layered lightly-laminated film 10i can have a diamond pattern 36c. The diamond pattern 36c can include alternating series of diamond-shaped thinner regions 46c defining un-bonded areas or regions 47c and thicker ribs 44a secured by bonds to form bonded regions 49d. The bonded regions can include stripes 49d oriented at an angle relative to the transverse direction such that the stripes 49d are neither parallel to the transverse or machine direction. The illustrated configuration may be achieved with two ring rolling operations, similar to that of FIG. 5, but in which the DD ring rollers of each operation are angularly offset relative to one another (e.g., one providing an angle of about 45° off of MD ring rolling, the other providing an angle of about 45° off of TD ring rolling). One will appreciate that DD ring rolling the film can biaxially orient the thinner, stretched regions 46c. In particular, orient the thinner, stretched regions 46c at an angle to the machine direction and the transverse direction.

In accordance with another implementation, a structural elastic like film (SELF) process may be used to create a thermoplastic film with strainable networks, which similarly results in discontinuous bonding of adjacent layers within a multi-layer film. As explained in greater detail below, the strainable networks can include adjacent bonded and un-bonded regions. U.S. Pat. No. 5,518,801; U.S. Pat. No. 6,139,185; U.S. Pat. No. 6,150,647; U.S. Pat. No. 6,394,651; U.S. Pat. No. 6,394,652; U.S. Pat. No. 6,513,975; U.S. Pat. No. 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 7:
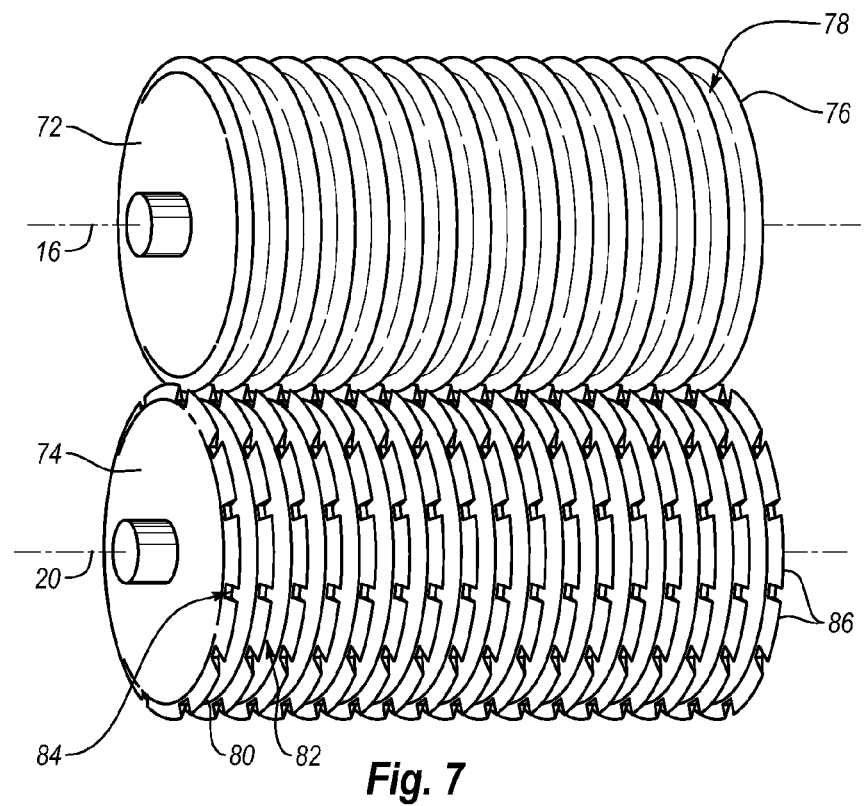
FIG. 7 illustrates a schematic diagram of a set of intermeshing rollers used to form a structural elastic like film (SELF) by imparting strainable networks into the film while lightly laminating adjacent layers of a film in accordance with one or more implementations of the present invention.

FIG. 7 illustrates a pair of SELF'ing intermeshing rollers 72, 74 for creating strainable networks with lightly bonded regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 7, however, the ridges 80 of the second SELF'ing intermeshing roller 74 can include a plurality of notches 84 that define a plurality of spaced teeth 86.

Figure 8:
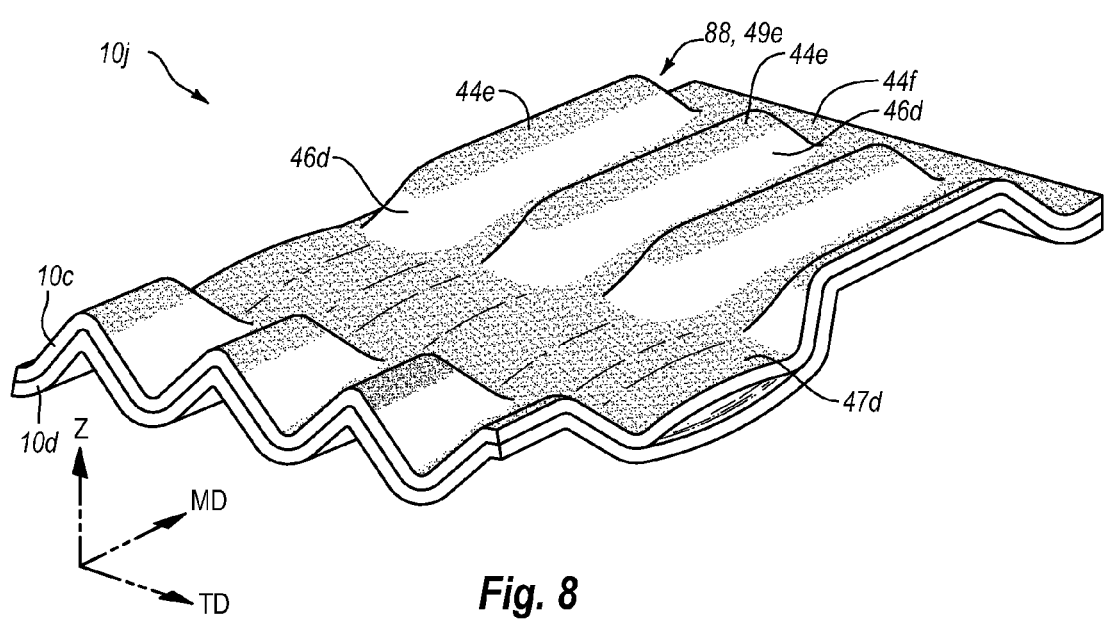
FIG. 8 illustrates a view of a multi-layered lightly-laminated thermoplastic film created by passing thermoplastic film through the intermeshing rollers of FIG. 7.

Referring now to FIG. 8, a multi-layered lightly-laminated film 10j with bonded regions dispersed about un-bonded regions created using the SELF'ing intermeshing rollers 72, 74 is shown. In particular, as the film passes through the SELF'ing intermeshing rollers 72, 74, the teeth 86 can press a portion of the multi-layer web or film out of plane to cause permanent deformation of a portion of the film in the Z-direction. The portions of the film that pass between the notched regions 84 of the teeth 86 will be substantially unformed in the Z-direction, resulting in a plurality of deformed, raised, rib-like elements 88. The length and width of rib-like elements 88 depends on the length and width of teeth 86.

As shown by FIG. 8, the strainable network of the multi-layered lightly-laminated film 10j can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88 of the strainable network. In one or more embodiments, the rib-like elements 88 can comprise bonded regions 49e can be discontinuous or separated as they extend across the multi-layered film 10j in both transverse and machine directions. This is in contrast to stripes that extend continuously across a film in one of the machine or transverse directions.

The rib-like elements 88 can allow the multi-layered lightly-laminated film 10m to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of multi-layered lightly-laminated film 10m which are generally discernible to the normal naked eye when the multi-layered film 10m or articles embodying the multi-layered lightly-laminated film 10m are subjected to an applied strain. Types of geometric deformation include, but are not limited to bending, unfolding, and rotating.

Thus, upon application of strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the multi-layered film 10m. Geometric deformation can result in significantly less resistive forces to an applied strain than that exhibited by molecular-level deformation.

In addition to improved properties thus provided by the ability to geometrically deform, the SELF"ing process also discontinuously and lightly laminates adjacent layers of the multi-layer film together, providing the benefits noted above. In particularly, the film layers 10c, 10d can be lightly laminated at regions 49e, but un-bonded at regions 47d. The strength of the lamination bond is relatively weak, so as to be less than the weakest tear resistance of the individual layers of the multi-layer film. Thus, the lamination bond is broken rather than the individual layer tearing upon application of a force. Typically, tearing in the MD direction requires less applied force than tearing in the TD direction, thus in one embodiment, the lamination bond strength is less than the MD tear resistance of each individual layer of the multi-layer film.

Figure 9:
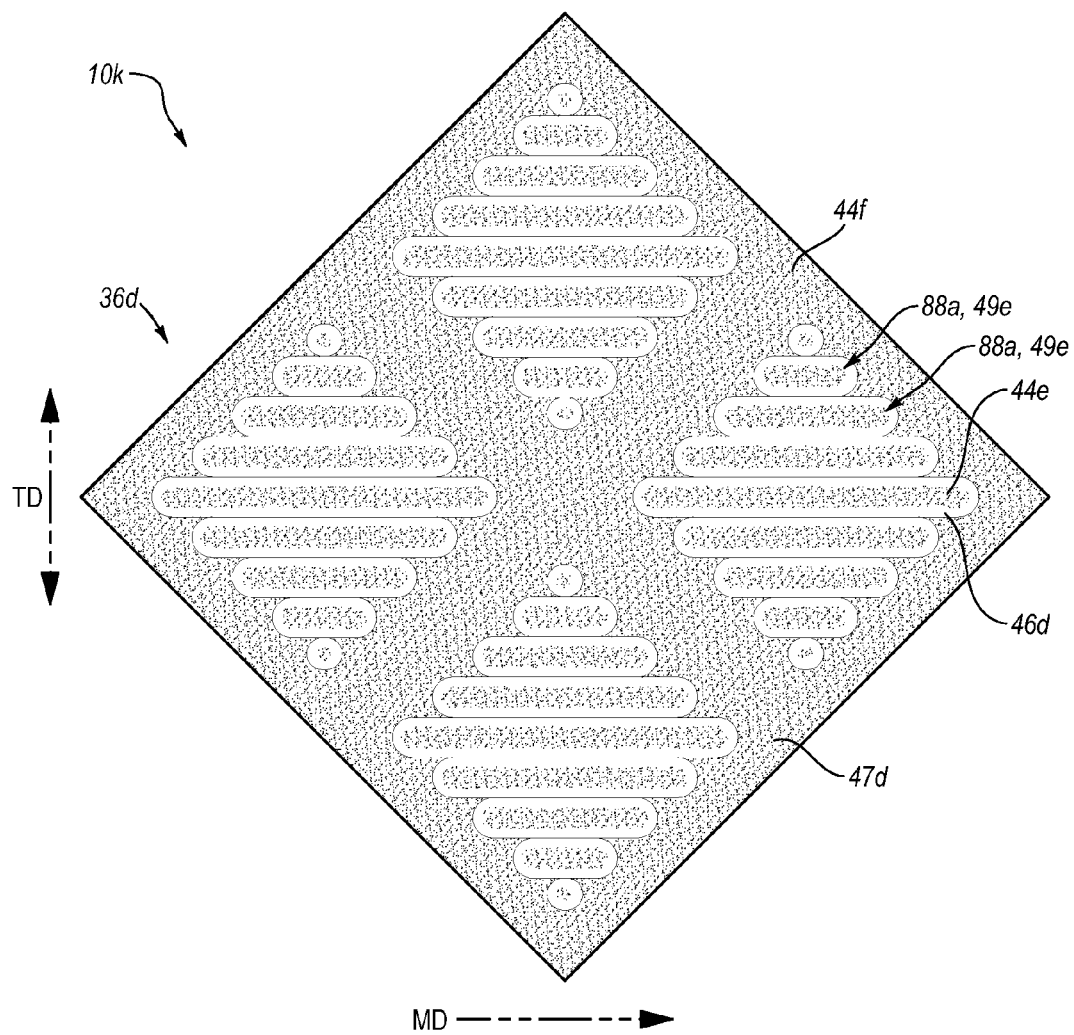
FIG. 9 illustrates a view of another multi-layered lightly-laminated thermoplastic film including strainable networks in accordance with one or more implementations of the present invention.

FIG. 9 illustrates a multi-layered lightly-laminated film 10k with a strainable network of rib-like elements 88a arranged in diamond patterns. The strainable network of the multi-layered lightly-laminated film 10k can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88a of the strainable network. In one or more embodiments, the rib-like elements 88a can comprise bonded regions 49e.

One or more implementations of the present invention can include strainable network patterns other than those shown by FIGS. 8 and 9, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine nor transverse directions.

One will appreciate in light of the disclosure herein that using ring rolling and/or SELFing to form the light bonds can provide the additional benefit of stretching the film layers, thereby reducing the basis weight of the multi-layered lightly-laminated film. Thus, using incremental stretching to form the light bonds can allow for multi-layer films at a lower basis weight (amount of raw material) to perform the same as or better than higher basis weight mono-layer or co-extruded films.

In addition to ring rolling and SELFing, one or more implementations include using embossing, stamping, adhesive lamination, ultrasonic bonding, or other methods of lightly laminating layers of a multilayer film. In such implementations, one or more of the layers of the multi-layered lightly-laminated film can be stretched to reduce the basis weight and/or modify the strength parameters of the film prior to lamination. Stretching of the individual layers can include incrementally-stretching (e.g., ring rolling, SELFing) or continuous stretching (e.g., MDO).

One will appreciate in light of the disclosure herein that the lightly bonded multi-layered films can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include lightly bonded multi-layer films to one extent or another. The films and methods of the present invention may particularly benefit trash bags and food storage bags.

Figure 10:
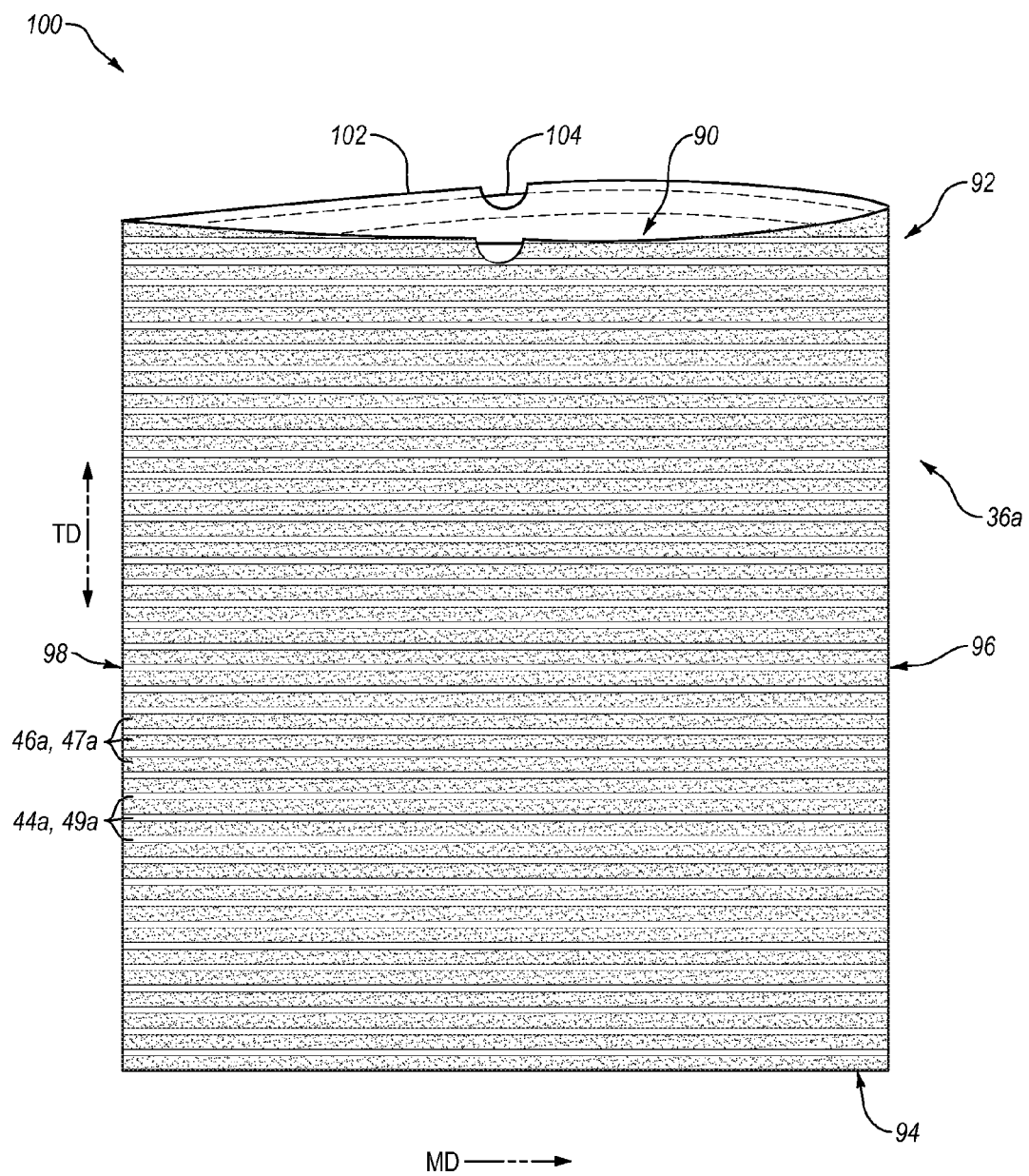
FIG. 10 illustrates a bag incorporating the multi-layered lightly-laminated film of FIG. 4 in accordance with one or more implementations of the present invention.

Referring to FIG. 10, the multi-layer film 10g illustrated in FIG. 4 is incorporated in a flexible draw tape bag 100. The bag 100 can include a bag body 92 formed from a piece of incrementally-stretched adhesively-laminated film 10g folded upon itself along a bag bottom 94. Side seams 96 and 98 can bond the sides of the bag body 92 together to form a semi-enclosed container having an opening 90 along an upper edge 102. The bag 100 also optionally includes closure means 104 located adjacent to the upper edge 102 for sealing the top of the bag 100 to form a fully-enclosed container or vessel. The bag 100 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include two film layers with thicker regions 44a that are bonded 49a and stretched regions 46a that are un-bonded. Both the bonded, thicker regions 44a, 49a and the stretched, unbounded regions 46a, 47a can form of stripes. The stripes can extend across the multi-layered bag 100 in the MD direction, or in other words, from the first side seam 96 to the second side seam 98. The multi-layered bag 100 can require less material to form than an identical bag formed with film 10a (not discontinuously laminated/incrementally stretched) of the same thermoplastic material. Additionally, despite requiring less material, the multi-layered bag 100 includes improved strength properties imparted by lightly bonding adjacent layers of the multi-layer film together.

Furthermore, a bag 100 formed from a multi-layered lightly-laminated film can have a first layer of thermoplastic material. The first layer can include first and second side walls joined along a bottom edge, a first side edge, and an opposing second side edge. In particular, the bottom edge of the first layer can comprise a fold. The bag 100 can also include a second layer of thermoplastic material. The second layer can include including first and second side walls joined along a bottom edge, a first side edge, and an opposing second side edge. The second layer is positioned within the first layer. Furthermore, the first and the second layer are light bonded to each other and incrementally stretched.

Figure 11:
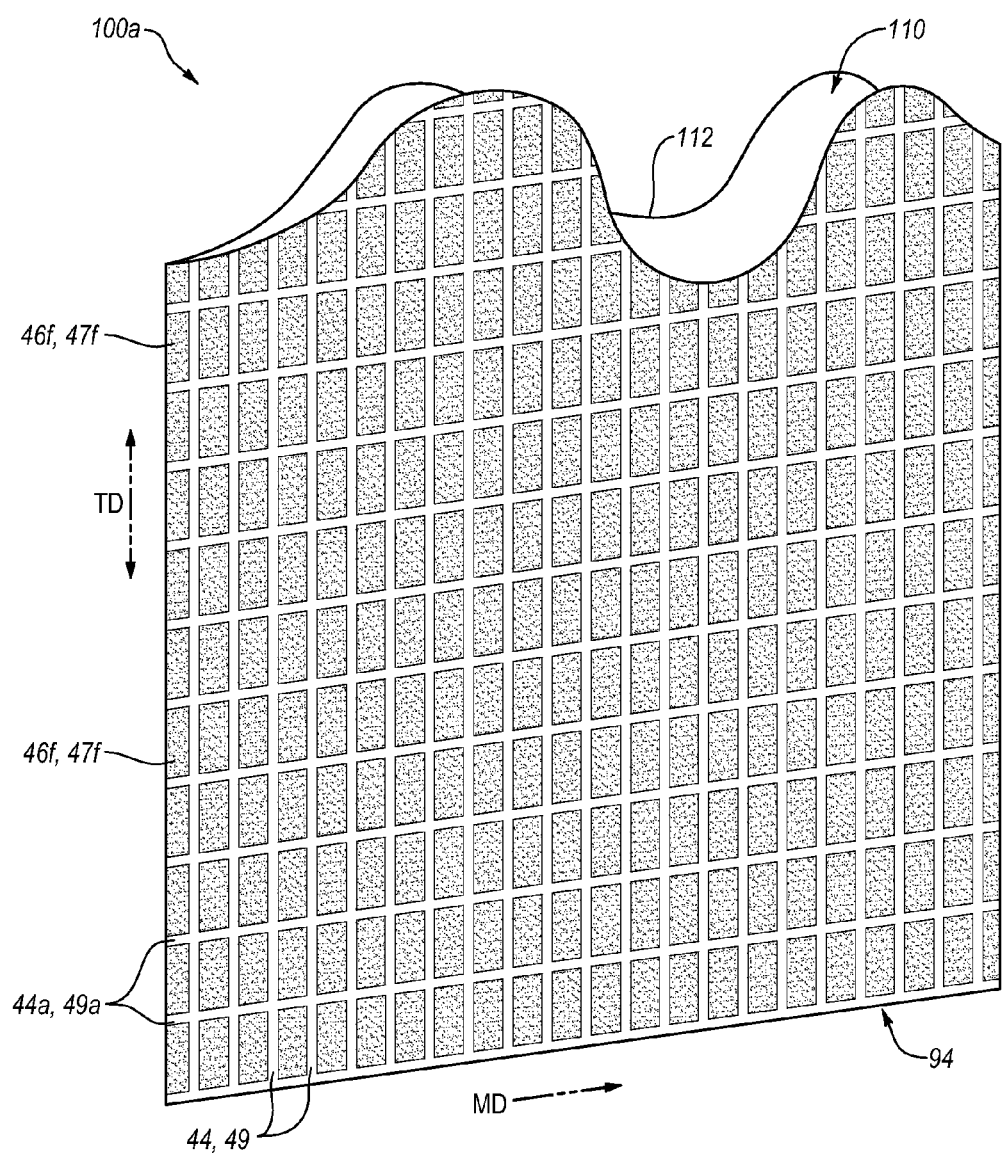
FIG. 11 illustrates a bag incorporating a multi-layered lightly-laminated film in accordance with one or more implementations of the present invention.

FIG. 11 illustrates a multi-layered tie bag 100a incorporating a multi-layered lightly-laminated film in accordance with an implementation of the present invention. As shown, the sides of the tie bag 100a can include a pattern of un-bonded, regions 47f and bonded regions 49, 49a created by MD and TD ring rolling. The lightly bonded regions can include stripes that extend across the bag 100a in the machine direction. Additionally, the bonded regions can include stripes that extend across the bag 100a in the transverse direction, or in other words from the bag bottom 108 to flaps 110 of an upper edge 112 of the multi-layered bag 100a. Bonded regions 49, 49a are characterized by relatively light bonding of adjacent layers of the multi-layer film, which acts to absorb forces into breaking of the lamination bond rather than allowing that same force to cause tearing of either of the layers of the multi-layer film. Such action provides significantly increased strength to the multi-layer film as compared to a monolayer similar thickness film or compared to a multi-layer film of similar thickness where the layers are strongly bonded together (i.e., at a bond strength at least as great as the tear resistance of the weakest layer). The lamination bond includes a bond strength that is advantageously less than the tear resistance of each of the individual films so as to cause the lamination bond to fail prior to tearing of the film layers.

In comparison with the film 10h of FIG. 5, the spacing between the MD extending thicker ribs or regions 44a are greater in the multi-layered bag 100a. Using MD ring rolls having a greater pitch between ridges creates this effect. Similarly, the spacing of the TD extending thicker ribs 44 is greater in the multi-layered bag 100a than the multi-layered film 10h. Using TD ring rolls having a greater pitch between ridges creates this effect. Furthermore, the relative spacing between the MD extending stripes and the TD extending stripes differs in the multi-layered bag 100a, while relative spacing is the same in the multi-layered film 10h. This effect is created by using TD ring rolls having a greater pitch between ridges compared to the pitch between ridges of the MD ring rolls.

One will appreciate in light of the disclosure herein that the use of intermeshing rollers with greater or varied ridge pitch can provide the different spacing and thicknesses of the stripes. Thus, a manufacturer can vary the ridge pitch of the intermeshing rollers to vary the pattern of the multi-layer film. The bond density (i.e., the fraction of surface area that is bonded relative to unbonded) and particular pattern provided not only affects the aesthetic appearance of the bag or film, but may also affect the strength characteristics provided. For example, higher bond density may provide increased strength as it provides a greater number of relatively low strength lamination bonds that may be broken so as to absorb forces, preventing such forces from leading to tearing of the bag or film. Film 10h of FIG. 5 has a higher bond density than the film of the bag 100a of FIG. 11.

By way of further example, where the MD tear resistance is lower than TD tear resistance for the particular films employed, it may be advantageous to provide a higher density of bonds in the MD than the TD direction. This may provide greater improvement to MD tear resistance of the multi-layered lightly-laminated film as compared to TD tear resistance improvement. A similar configuration could be provided for films in which the TD tear resistance was lower than MD tear resistance by increasing bond density in the TD direction.

Figure 12:
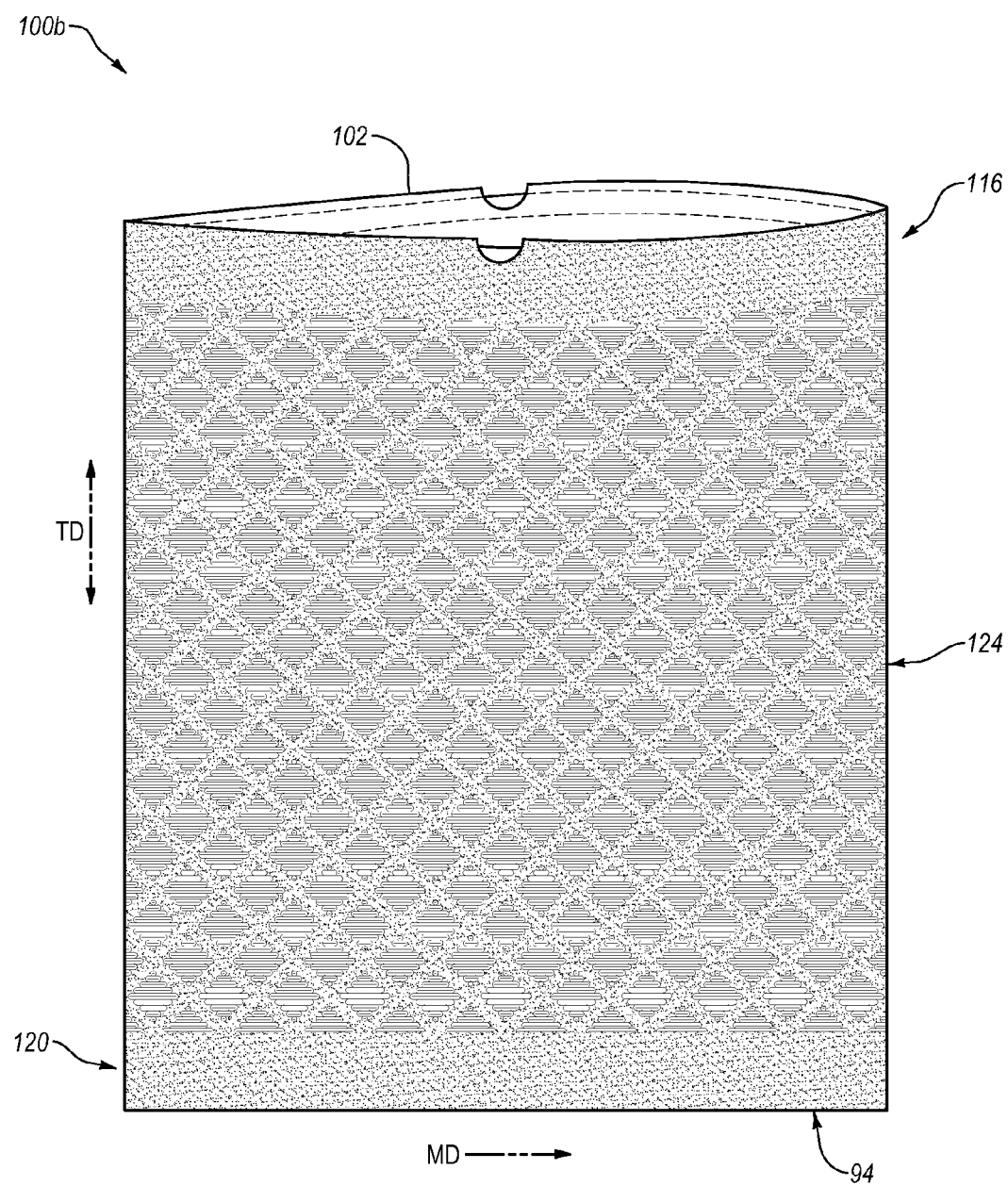
FIG. 12 illustrates a bag incorporating a middle section having lightly bonded regions in accordance with one or more implementations of the present invention.

In addition to varying the pattern of bonded and un-bonded regions in a bag or film, one or more implementations also include providing lightly bonded regions in certain sections of a bag or film, and only un-bonded (or alternatively tightly bonded) regions in other sections of the bag or film. For example, FIG. 12 illustrates a multi-layered bag 100b having an upper section 116 adjacent a top edge 118 that is devoid of bonded regions. Similarly, the multi-layered bag 100b includes a bottom section 120 adjacent a bottom fold or edge 122 devoid of bonded regions. In other words, both the top section 116 and bottom section 120 of the multi-layered bag 100b can each consist only of un-bonded regions. Alternatively, the layers of sections 116 and 120 may be tightly bonded together (e.g., co-extruded). In any case, sections 116 and 120 may be void of bonds.

A middle section 124 of the multi-layered bag 100b between the upper and lower sections 116, 120 on the other hand can include lightly bonded regions interspersed with un-bonded regions. In particular, FIG. 12 illustrates that the middle section can include a strainable network of rib-like elements arranged in diamond patterns similar to the multi-layered lightly-laminated film 10k of FIG. 9. Thus, the middle section 124 of the multi-layered bag 100b can include improved strength created by the light bonds of the strainable network.

Figure 13:
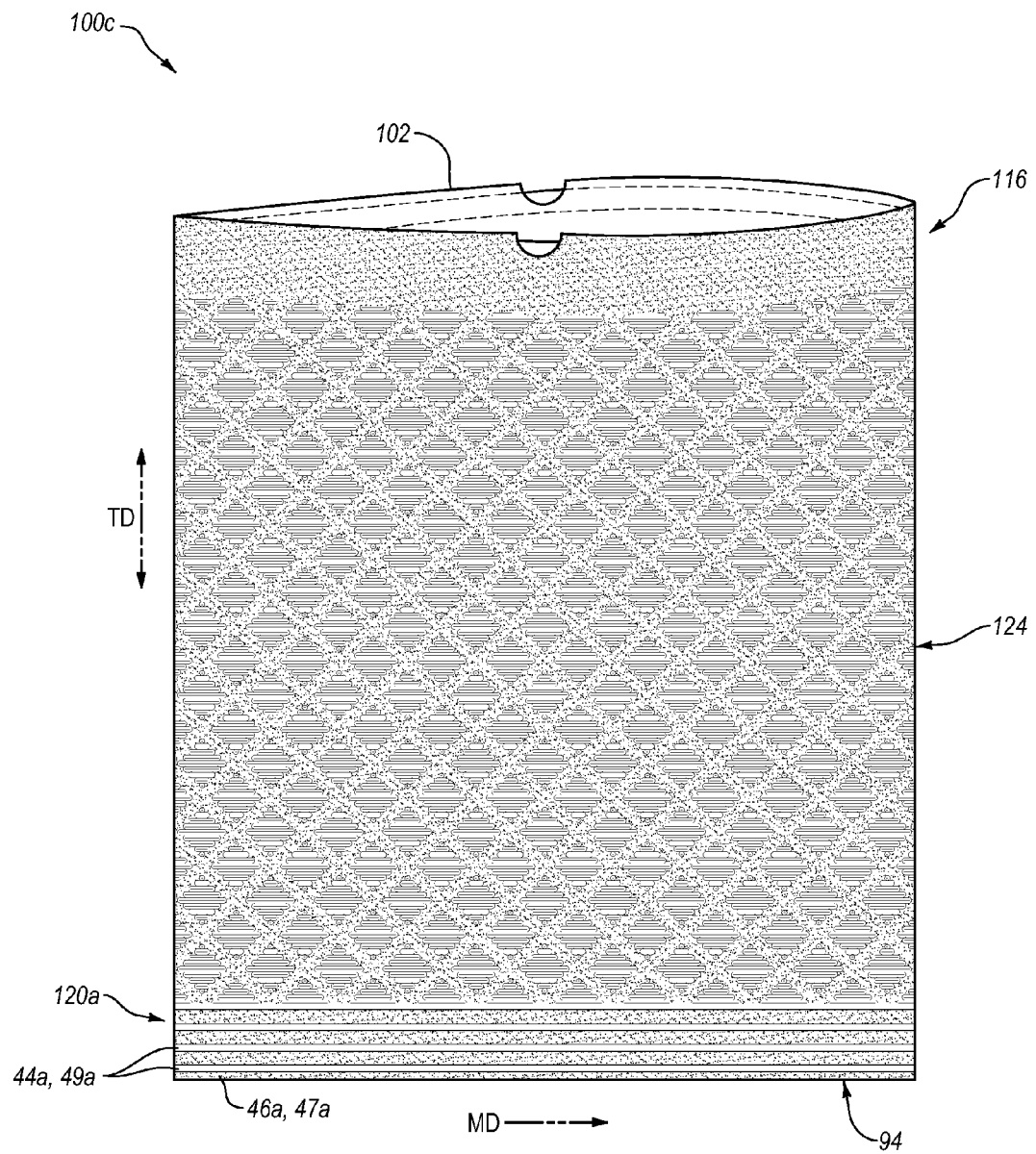
FIG. 13 illustrates a bag incorporating sections of different patterns of lightly bonded regions in accordance with one or more implementations of the present invention.

In one or more additional implementations the present invention includes providing different lightly bonded regions in different sections of a bag or film. For example, FIG. 13 illustrates a multi-layered bag 100c similar to the multi-layered bag 100b of FIG. 12, except that the bottom section 120a includes alternating series of stretched, un-bonded regions 46a, 47a and thicker bonded regions 44a, 49a created by TD ring rolling. Thus, the middle section 124 of the bag 100c can include properties of increased strength as a result of light discontinuous lamination and increased elasticity through geometric deformation, while the bottom section includes increased strength as a result of light partially discontinuous lamination by TD ring rolling.

Figure 14:
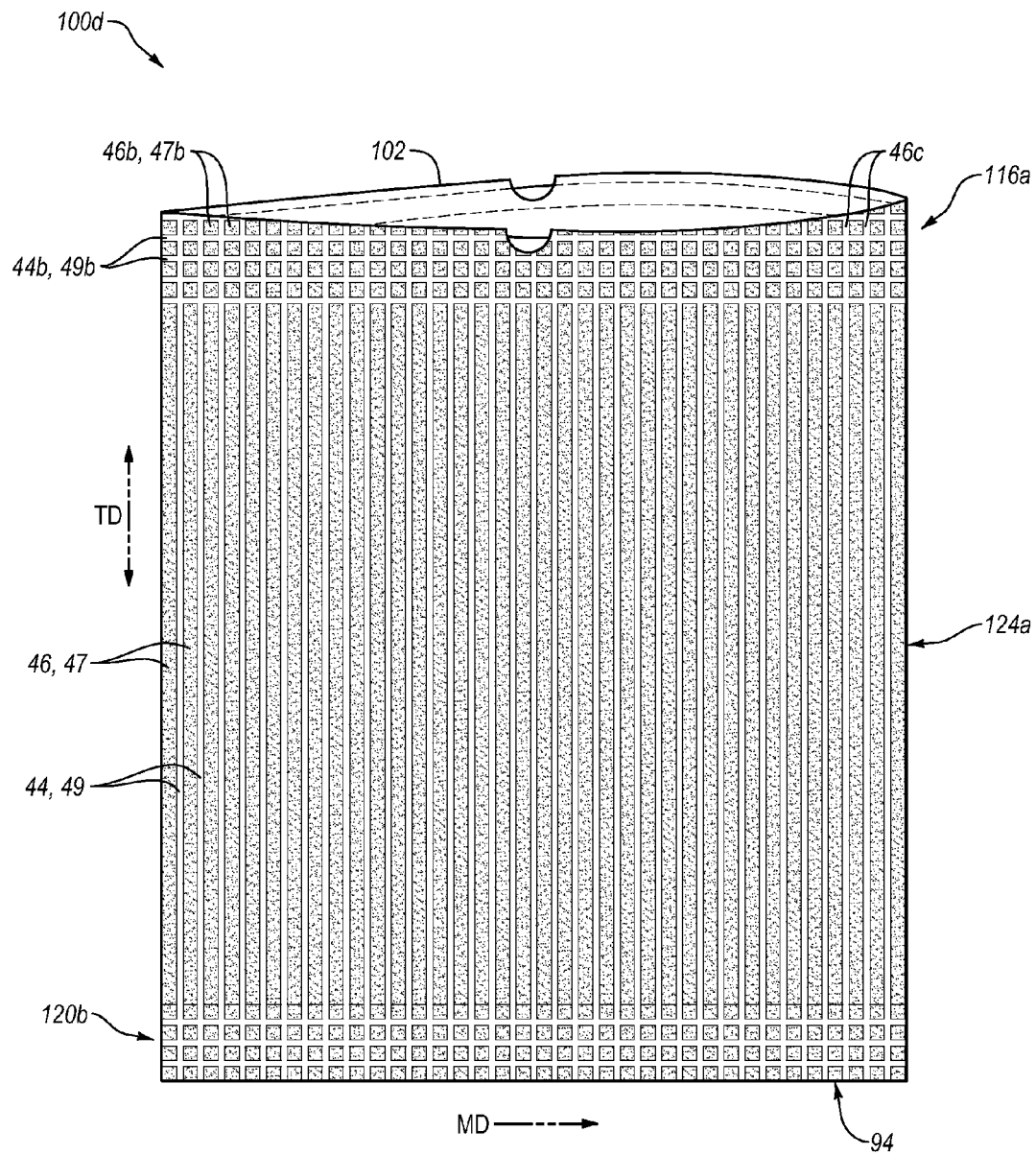
FIG. 14 illustrates another bag incorporating sections of different patterns of lightly bonded regions in accordance with one or more implementations of the present invention.

FIG. 14 illustrates yet another multi-layered bag 100d including an upper section 116a adjacent a top edge 118 that includes alternating series of thicker, bonded regions 44b, 49b and stretched, thinner un-bonded regions 46b, 47b created by MD and TD ring rolling similar to the film 10h of FIG. 5. Furthermore, the middle section 124a of the multi-layered bag 126 can include thicker, bonded regions 44, 49 and stretched, thinner, un-bonded regions 46, 47 in the form of stripes created by MD ring rolling.

Figure 15:
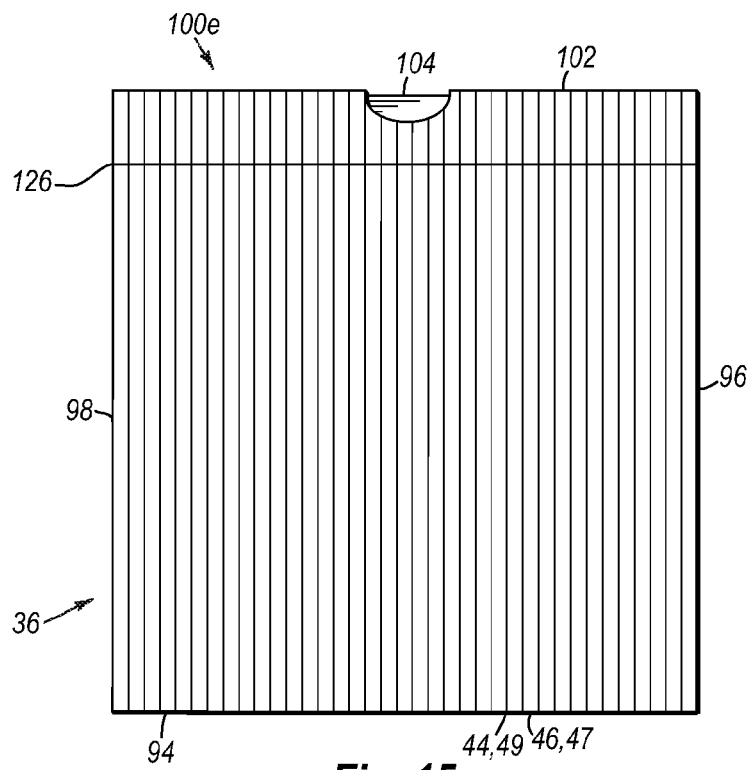
FIG. 15 illustrates another bag incorporating a multi-layered lightly-laminated film formed by passing thermoplastic film through MD ring rolls in accordance with one or more implementations of the present invention.

FIG. 15 illustrate yet another multi-layered bag 100e. The multi-layered bag 100e is formed from a MD incrementally-stretched multi-layered lightly-laminated film 10b, such as that of FIG. 2. The bag 100e can include an inner layer 10c and an outer layer 10d that are lightly bonded together by bonds 49. Additionally, a hem seal 126 (to hold in the draw string 104) and side seals (i.e., seals at side edges 96 and 98) can additionally secure the inner layer 10c to the outer layer 10d. A bottom fold 94 can be positioned opposite a top edge 102.

The thicker ribs 44 can include bonded stripes that extend across the bag 100e in a direction transverse (i.e., transverse direction) to a direction in which the film was extruded (i.e., machine direction). In particular, the thicker ribs 44 and the bonds 49 can extend from the bottom 94 of the bag 100e to the top edge 102. As shown by FIG. 15, the bonded stripes or bonded regions 49 can extend across the entire length of the bag 100e. One will appreciate in light of the disclosure herein that the striped pattern 36 may vary depending on the method used to incrementally stretch and partially discontinuously bond adjacent layers of film 10. To the extent that MD or other ring rolling is used to lightly bond the film 10, the striped pattern 36 (e.g., width and spacing of the stripes or stretched regions 44) on the film 10 can depend on the pitch 32 of the ridges 24, 26, the DOE 34, and other factors. As regions 49 represent areas of the multi-layer film in which the adjacent layers are lightly bonded to one another, it will be apparent that altering the spacing and/or width of regions 49 can affect the overall strength of the film. For example, providing more bonded surface area relative to the unbonded surface area can increase the density of such bonds that can absorb forces, increasing the film strength.

Figure 16:
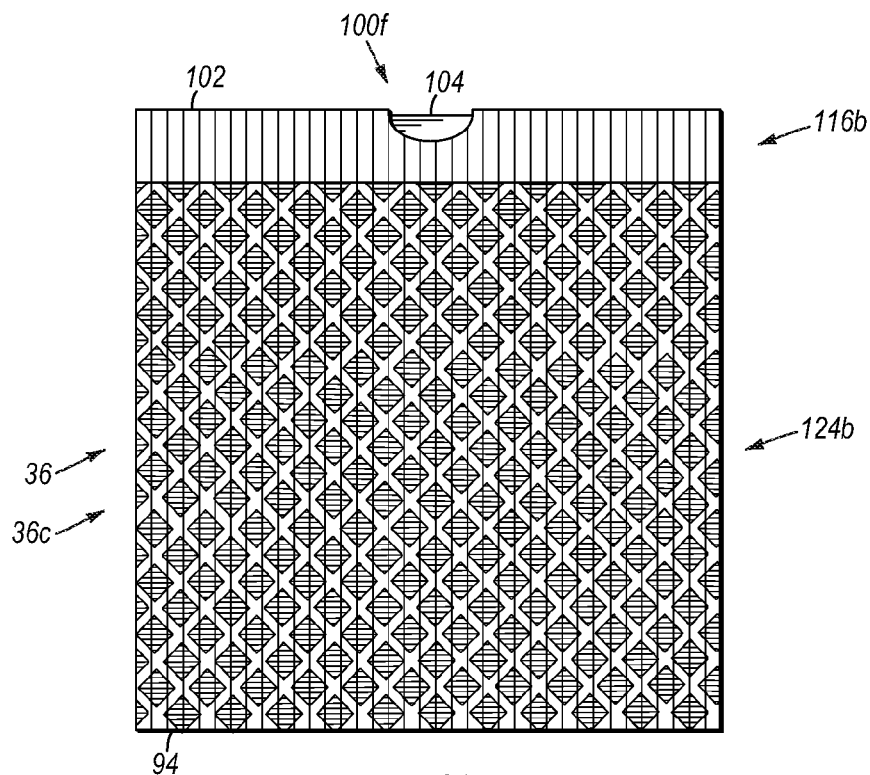
FIG. 16 illustrates a bag incorporating a multi-layered lightly-laminated film formed by passing thermoplastic film through MD ring rollers and SELFing rollers in accordance with one or more implementations of the present invention.

FIG. 16 illustrates a multi-layered bag 100f similar to the multi-layered bag 100e of FIG. 15, albeit that a lower section 124b of the bag 100f includes a stainable network in a pattern 36c of diamond shaped ribs similar to that described herein in above in reference to FIGS. 7-9. Thus, the density of bonds in the middle section 124b of the bag 100f can be greater than the density of bonds in an upper section 116b of the multi-layer bag 100f. Along related lines the lower section 124*b* of the multi-layer bag 100*f* can have a lower gauge-by-weight (i.e., be thinner on average) than the upper section 116*b*.

FIG. 16 further illustrates that the upper section 116*b* can begin at the hem seal and extend to the top edge 102 of the multi-layer bag 100*f*. Additionally, the lower section 124*b* of the multi-layer bag 100*f* can extend from the hem seal to the bottom fold 64 of the multi-layer bag 100*f*.

Figure 17:
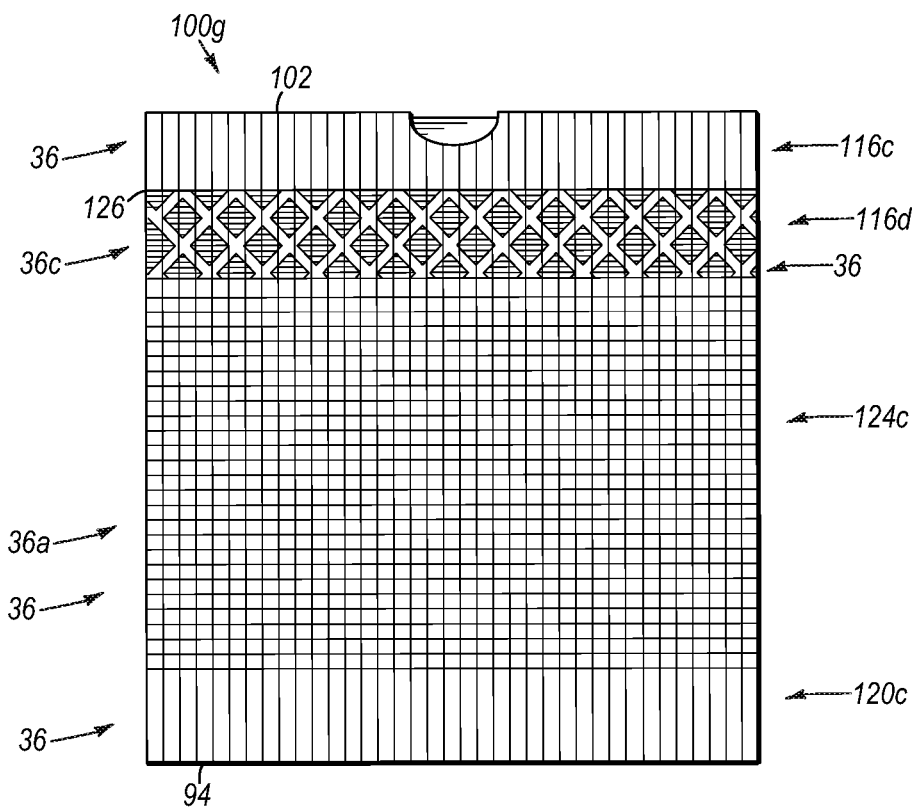
FIG. 17 illustrates another bag incorporating a multi-layered lightly-laminated film formed by passing thermoplastic film through MD ring rollers, TD ring rollers, and SELFing rollers in accordance with one or more implementations of the present invention.

FIG. 17 illustrates yet another multi-layer bag 100*g* similar to the multi-layer bag 100*e* of FIG. 15. The multi-layer bag 100*g* includes a top section 116*c* that extends from the top edge 102 of the multi-layer bag 100*g* to the hem seal 126. The multi-layer bag 100*g* also includes a bottom section 120*c* that extends from the bottom 94 of the multi-layer bag 100*g* toward the top edge 102. In one or more embodiments, the top section 116*c* and the bottom section 120*c* can have approximately the same width as shown in FIG. 17. The multi-layer bag 100*g* can further include an upper section 116*d* that extends from the top section 116*c* and the hem seal 126 toward the bottom 94 of the multi-layer bag 100*g*. In one or more embodiments, the upper section 116*d* has a width approximately the same as or the same as the top and bottom sections 116*c*, 120*c*. Finally, the multi-layer bag 100*g* can include a middle section 124*c* located between the upper section 116*d* and the bottom section 120*c*. The middle section 124*c* can comprise the majority of the multi-layer bag 100*g* as shown in FIG. 17.

As with the other multi-layer bags described herein, the multi-layer bag 100*g* can comprise an inner layer or film of material bonded to an outer layer or film of material. FIG. 17 illustrates that the different sections of the multi-layer bag 100*g* can include different bond patterns to provide the different areas of the multi-layer bag 100*g* with different properties. FIG. 17 illustrates that the entire multi-layer bag 100*g* can include a pattern 36 of thicker, bonded regions and stretched, unbounded regions as described above in relation to FIGS. 1A-2.

Furthermore, FIG. 17 illustrates that the bottom and top sections 120*c*, 116*c* can consistent of the pattern 36 of thicker, bonded regions and stretched, unbounded regions (i.e., the only bonds in the bottom and top sections 120*c*, 116 besides the side seals and hem seal(s) can be bonds formed by MD ring rolling). The upper section 116*c* can further include a strainable network in a pattern 36*c* of diamonds or anther shape as described above in relation to FIGS. 7-9 in addition to the pattern 36 of bonds. Finally, the middle section 124*c* can include a pattern 36*a* of MD extending thicker, bonded regions and stretched, unbounded regions as described above in relation to FIGS. 3A-4.

Figure 18:
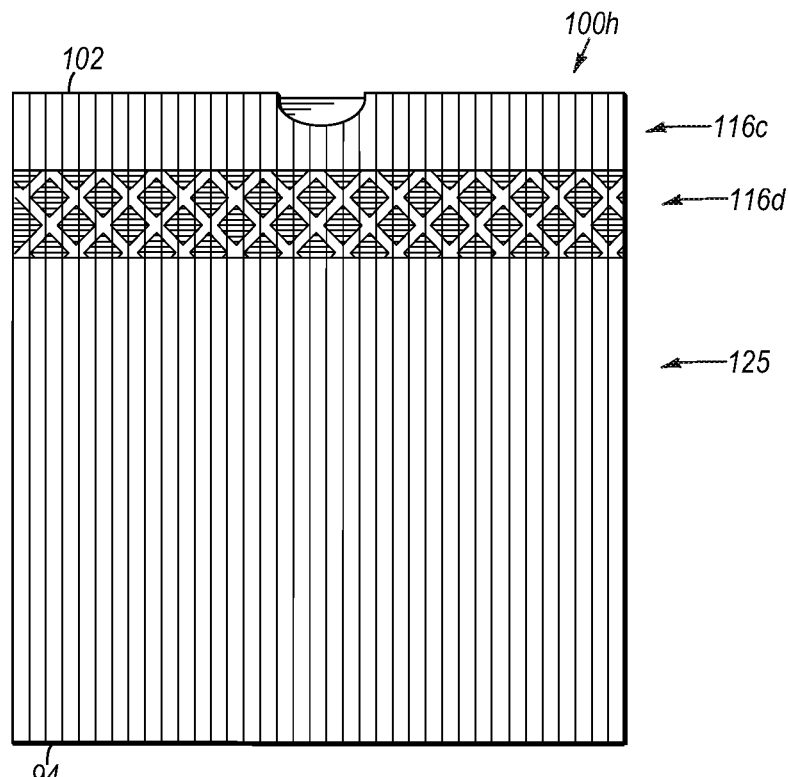
FIG. 18 illustrates another bag incorporating a multi-layered lightly-laminated film formed by passing thermoplastic film through MD ring rolls and SELFing rollers in accordance with one or more implementations of the present invention.

FIG. 18 illustrates still another the multi-layer bag 100*h*. The multi-layer bag 100*h* includes a top section 116*c* that extends from the top edge 102 of the multi-layer bag 100*g* to the hem seal 126. The multi-layer bag 100*h* includes an upper section 116*d* that extends from the top section 116*c* and the hem seal 126 toward the bottom 94 of the multi-layer bag 100*g*. In one or more embodiments, the top section 116*c* and the upper section 116*d* can have approximately or exactly the same width as shown in FIG. 18. Finally, the multi-layer bag 100*h* can include a bottom section 125 that extends from the bottom 94 of the multi-layer bag 100*h* toward to the upper section 116*d*.

FIG. 18 illustrates that the multi-layered bag 100*h* is similar to the multi-layered bag 100*e* of FIG. 15, albeit that the upper section 116*d* of the bag 100*f* includes a strainable network in a pattern 36*c* of diamond shaped ribs similar to that described herein in above in reference to FIGS. 7-9.

Thus, the density of bonds in the upper section 124*b* of the bag 100*h* can be greater than the density of bonds elsewhere in the bag 110*h*.

Thus, one will appreciate in light of the disclosure herein that a manufacturer can tailor specific sections or zones of a bag or film with desirable properties by MD, TD, DD ring rolling, SELF'ing, or combinations thereof. One will appreciate in light of the disclosure herein that one or more implementations can include bonded regions arranged in other patterns/shapes. Such additional patterns include, but are not limited to, intermeshing circles, squares, diamonds, hexagons, or other polygons and shapes. Additionally, one or more implementations can include bonded regions arranged in patterns that are combinations of the illustrated and described patterns/shapes.

In one or more implementations, each bonded pattern may have a largest TD patterned width in the transverse direction (TD) of less than about 25% of the transverse width of the patterned film, or less than about 20% of the transverse width of the film, or less than about 10% of the transverse width of the patterned film, or less than about 5% of the transverse width of the film. In one or more implementations, the bonded patterns should have a largest MD patterned width in the machine direction of less than about 25% of the machine width 140 of the patterned film, or less than about 20% of the machine width of the film, or less than about 10% of the machine width of the film, or less than about 5% of the transverse width of the film.

In one or more implementations, the width of the bonded patterns in the transverse direction may be greater than the width of the un-bonded areas in the transverse direction. The width of the bonded patterns in the machine direction or direction perpendicular to the transverse direction may be greater than the width of the un-bonded areas in the machine direction.

The bond density of the multi-layered lightly-laminated films and bags incorporating the same can be varied to control the bond strength between the layers. For example, bonded areas of multi-layered lightly-laminated films and bags incorporating the same can be large in comparison to un-bonded areas. For example, bonded areas of multi-layered lightly-laminated films and bags incorporating the same can represent at least about 50% of the total area of the entire film, the entire bag, or the section where the lamination occurs, or at least about 60% of the entire film, the entire bag, or total area of the section where the lamination occurs, at least about 70% of the entire film, the entire bag, or total area of the section where the lamination occurs, at least about 80% of the total area of the entire film, the entire bag, or section where the lamination occurs. In other embodiments, the bonded areas of multi-layered lightly-laminated films and bags incorporating the same can represent substantially less than about 50% of the total area of the entire film, the entire bag, or section where the lamination occurs, or less than about 40% of the total area of the entire film, the entire bag, or section where the lamination occurs, or less than about 30% of the total area of the entire film, the entire bag, or section where the lamination occurs, or less than about 10% of the total area of the entire film, the entire bag, or section where the lamination occurs.

As mentioned previously, numerous methods can be used to provide the desired degree of lamination in the bonded areas. Any of the described ring rolling techniques may be combined with other techniques in order to further increase the strength of the lamination bond while maintaining bond strength below the strength of the weakest layer of the multi-layer film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Adjusting (e.g., increasing) the strength of the relatively light lamination bonding could be achieved by addition of a tackifier or adhesive to one or more of the skin plies of a multi-layer film, or by incorporating such a component into the material from which the film layer is formed. For example, the outer skin sublayers of a given layer could contain from about 0 to about 50% of a polyolefin plastomer tackifier such as a $C_4$-$C_{10}$ olefin to adjust bonding strength by increasing the tackiness of the surfaces of adjacent layers to be lightly laminated.

In one or more implementations, a component may be included to decrease tackiness. For example, the outer skin sublayers could contain higher levels of slip or anti-block agents, such as talc or oleamide (amide of oleic acid), to decrease tack. Similarly, these surfaces may include very low levels of or be substantially void of slip or anti-block agents to provide a relative increase in tackiness. In still further embodiments the films 10c, 10c can be co-extruded together with a light bond. Ring rolling or SELFing can then cause portions of the light bonds to break thereby forming bonded and un-bonded regions such as those described hereinabove.

In another implementation, a pattern may be formed by embossing, in a process similar to ring rolling. Embossed patterns such as squares, diamonds, circles or other shapes may be embossed into a multi-layer film. The embossed, laminated film layers may be prepared by any suitable means by utilizing two or more layers of preformed web of film and passing them between embossing rollers. The method of embossing multiple layers of film can involve calendar embossing two or more separate, non-laminated layers with discrete "icons" to form bonded areas or icons, each icon having a bonded length and separated from adjacent icons by an equivalent un-bonded length. Such icons may be any desired design or shape, such as a heart, square, triangle, diamond, trapezoid, or circle.

One or more implementations of the present invention can also include methods of forming multi-layered lightly-laminated film and bags including the same. FIGS. 19-25 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 19:
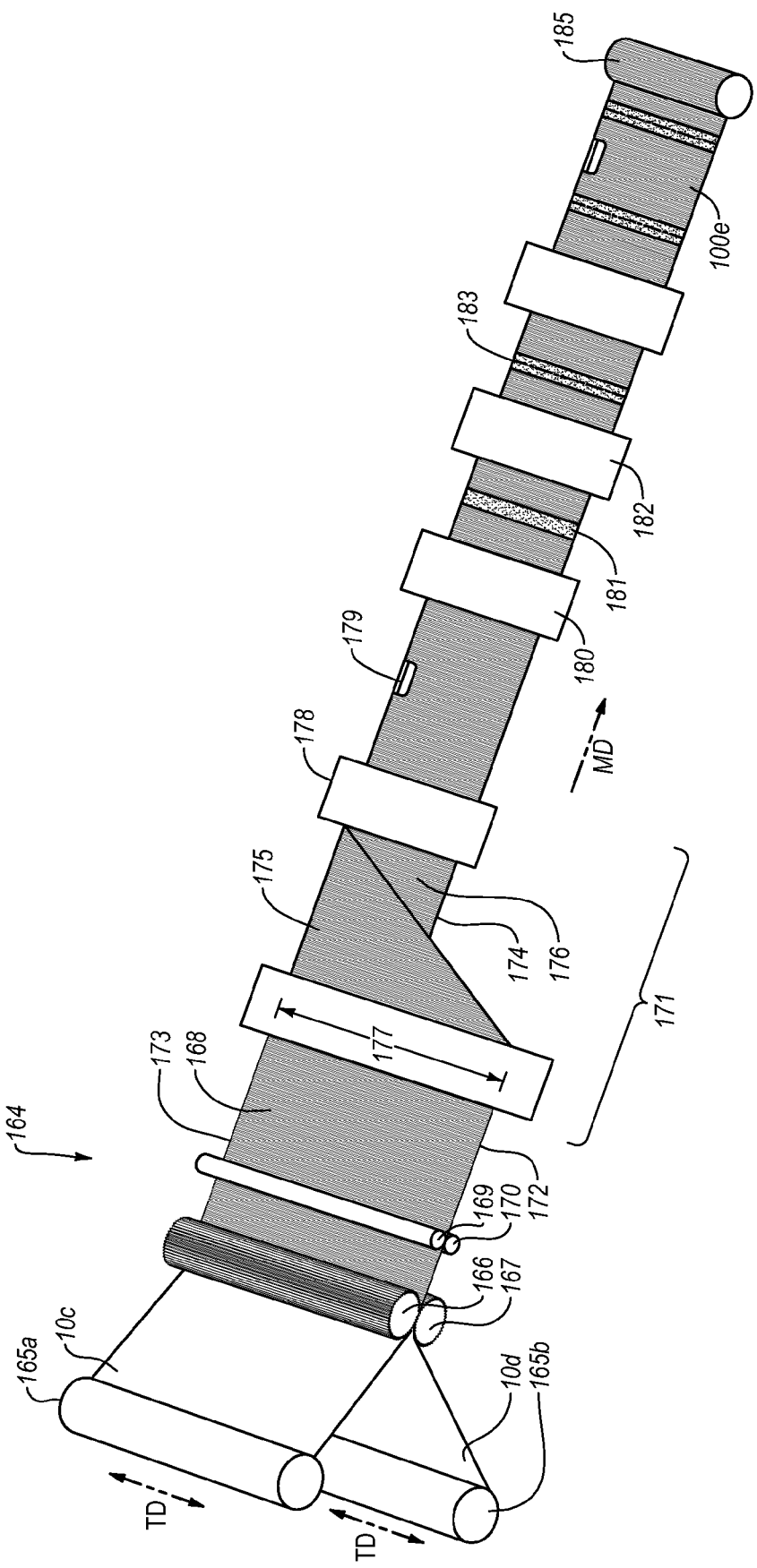
FIG. 19 illustrates a schematic diagram of a bag manufacturing process in accordance with one or more implementations of the present invention.

FIG. 19 illustrates an exemplary embodiment of a high-speed manufacturing process 164 for creating multi-layered lightly-laminated thermoplastic film(s) and then producing multi-layered plastic bags therefrom. According to the process 164, a first thermoplastic film layer 10c and a second thermoplastic film layer 10d are unwound from roll 165a and 165b, respectively, and directed along a machine direction. Alternatively, the film layers 10c, 10d can be directly from one or more extrusion towers rather than stock rolls 165a, 165b.

The film layers 10c, 10d may pass between first and second cylindrical intermeshing rollers 166, 167 to incrementally stretch and lightly laminate the initially separate film layers 10c, 10d to create un-bonded regions and bonded regions in at least one section of a multi-layered lightly-laminated film 10b. The intermeshing rollers 166, 167 shown in FIG. 19 have a construction similar to that of intermeshing rollers 12, 14 of FIGS. 1A-1B. In other embodiments, the intermeshing rollers 166, 167 can have the configuration of any of the other intermeshing rollers shown or described herein. The rollers 166, 167 may be arranged so that their longitudinal axes are perpendicular to the machine direction. Additionally, the rollers 166, 167 may rotate about their longitudinal axes in opposite rotational directions as described in conjunction with FIG. 1A. In various embodiments, motors may be provided that power rotation of the rollers 166, 167 in a controlled manner. As the film layers 10c, 10d pass between the first and second rollers 166, 167 the ridges and/or teeth of the intermeshing rollers 166, 167 can form a multi-layered lightly-laminated film 10a.

During the manufacturing process 164, the multi-layered lightly-laminated film 10b can also pass through a pair of pinch rollers 169, 170. The pinch rollers 169, 170 can be appropriately arranged to grasp the multi-layered lightly-laminated film 10b.

A folding operation 171 can fold the multi-layered lightly-laminated film 10b to produce the sidewalls of the finished bag. The folding operation 171 can fold the multi-layered lightly-laminated film 10b in half along the transverse direction. In particular, the folding operation 171 can move a first edge 172 adjacent to the second edge 173, thereby creating a folded edge 174. The folding operation 171 thereby provides a first film half 175 and an adjacent second web half 176. The overall width 177 of the second film half 176 can be half the width 177 of the pre-folded multi-layered lightly-laminated film 10b.

To produce the finished bag, the processing equipment may further process the folded multi-layered lightly-laminated film 10b. In particular, a draw tape operation 178 can insert a draw tape 179 into ends 172, 173 of the multi-layered lightly-laminated film 10b. Furthermore, a sealing operation 180 can form the parallel side edges of the finished bag by forming heat seals 181 between adjacent portions of the folded multi-layered lightly-laminated film 10b. The heat seal 181 may strongly bond adjacent layers together in the location of the heat seal 181 so as to tightly seal the edges of the finished bag. The heat seals 181 may be spaced apart along the folded multi-layered lightly-laminated film 10b to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 100e that may be separated from the multi-layered lightly-laminated film 10b. A roll 185 can wind the multi-layered lightly-laminated film 10b embodying the finished bags 184 for packaging and distribution. For example, the roll 185 may be placed into a box or bag for sale to a customer.

In still further implementations, the folded multi-layered lightly-laminated film 10b may be cut into individual bags along the heat seals 181 by a cutting operation. In another implementation, the folded multi-layered lightly-laminated film 10b may be folded one or more times prior to the cutting operation. In yet another implementation, the side sealing operation 180 may be combined with the cutting and/or perforation operations 182.

Figure 20A:
FIGS. 20A-20D illustrate steps in a process for forming multi-layer composite folded films from a blown continuous film tube in accordance with one or more implementations of the present invention.
Figure 20B:
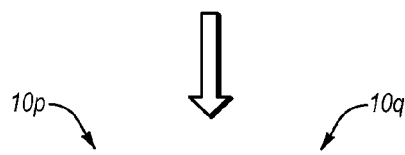
Figure 20C:
Figure 20C:
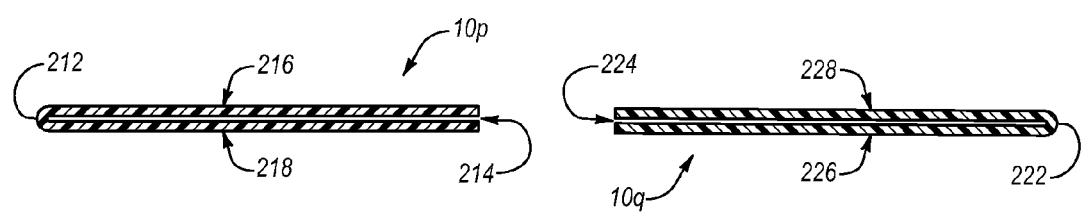

One will appreciate in light of the disclosure herein that the process 164 described in conjunction with FIG. 19 can be modified to omit or expand acts, vary the order of the various acts, or otherwise alter the process, as desired. For example, three or more separate film layers can be discontinuously laminated together to form a multi-layered lightly-laminated film 10b. Additionally, the process can omit the folding sub-process 171. In particular, in one or more embodiments can begin with a stock roll including a folded film within another folded film such as those described in International Patent Application Publication No. PCT/US14/24431, previously incorporated by reference herein in its entirety. To form a film assembly of a first folded film layer within a second folded film layer, a manufacturer can slit the flat tube 200 (from an extrusion tower) down the middle of the collapsed tube to form two film halves 10p, 10q, as shown by FIGS. 20A-20B. Various well know means may be used to slit film tube 200. In alternative, embodiments the manufacturer can slit the collapsed tube at the edges 204, 202. Once slit, a manufacturer can pass the two flat films 10p, 10q over a v-board to form two folded films, as shown in FIG. 20C.

As illustrated, the folded film 10p can comprise a folded edge 212, an open edge 214, a first half or portion 216, and a second half or portion 218. Similarly, the folded film 10q can comprise a folded edge 222, an open edge 224, a first half or portion 226, and a second half or portion 228. Thus, as shown, each of the folded films 10p, 10q (and the other folded films described herein) can comprise a "c," "j," or "u" configuration. As such, the folded films 10p, 10q may be referred to herein as c-folded, j-folded films, or u-folded films. C-folded films can comprise films that are symmetrical about their folded edge, while j- or u-folded films can comprise films that are not symmetrical about their folded edge (i.e., one of the halves extend farther than the other).

Figure 20D:
Figure 20D:
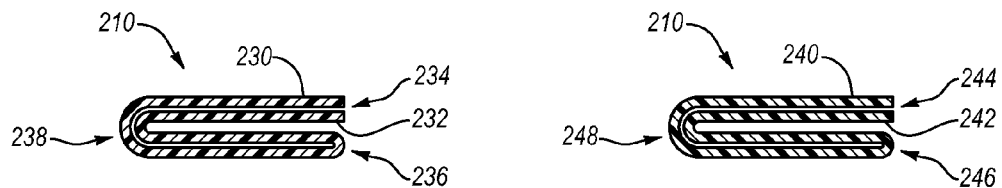

A manufacturer can then pass each of the folded films over a v-board to form multi-layer composite folded films 210 and 210 (or as called herein a film assembly of a first folded film layer within a second folded film layer), as shown by FIG. 20D. The second half 218, 228 of each folded film 10p, 10q (FIG. 20C) can form the outer layer 230, 240 of the multi-layer composite folded films 210 and 210. Similarly, the first half 216, 226 of each folded film 10p, 10q (FIG. 20C) can form the inner layer 232, 242 of the multi-layer composite folded films 210 and 210.

The folded edges 212, 222, respectively, of each folded film 10p, 10q (FIG. 20C) can form a first end 234, 244 of the multi-layer composite folded films 210 and 210. Similarly, the open edges 214, 224, respectively, of each folded film 10p, 10q (FIG. 20C) can form a second end 236, 246 of the multi-layer composite folded films 210 and 210. Optionally, the manufacturer can slit the folded edges 212, 222 that form the second ends 236, 246.

In any event, the resulting multi-layer composite folded films 210 are each comprised of a second folded film 232, 242 inserted within a first folded film 230, 240. The resulting multi-layer composite folded films 210 each have a folded edge 238, 248 and opposing open ends 234, 236, 244, 246.

Thus, films may be formed into folded films or webs such as c-folded films and webs or u-folded films or webs. As described in relation to FIGS. 20A-20D, folded films and webs may be formed by collapsing and then cutting an annular tube of film formed using a blown film process. In particular, the annular tube can be cut in half to form two folded films (which are mirror images of each other). In another processes, a film assembly of a first folded film layer within a second folded film layer may be formed by the mechanical folding of film layers.

Figure 21:
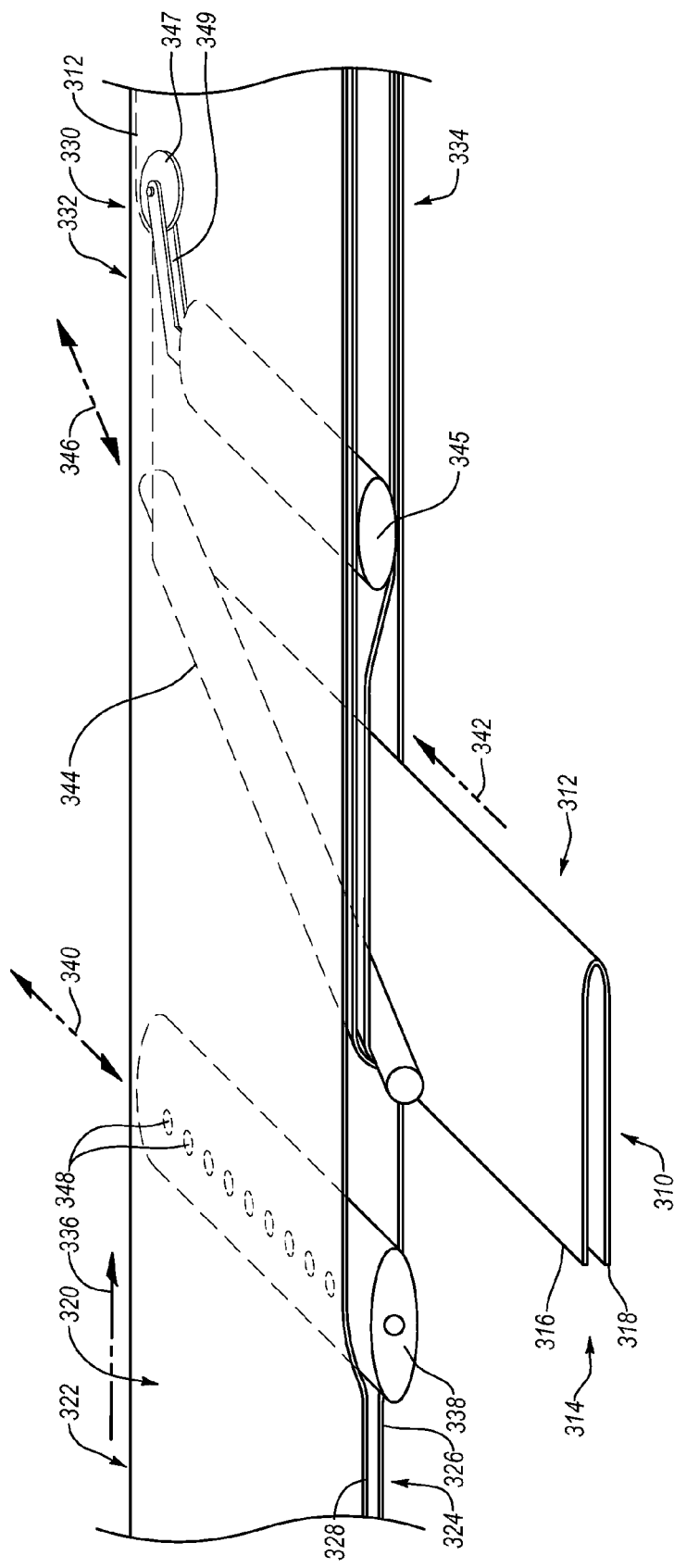
FIG. 21 illustrates a process and apparatus for inserting a folded film into another folded film in accordance with an implementation of the present invention.

Referring now to the Figures, FIG. 21 illustrates one exemplary process and apparatus for inserting a folded film into another folded film in accordance with an implementation of the present invention to create a film assembly of a first folded film layer within a second folded film layer. In particular, FIG. 21 illustrates an insertion process that inserts one folded film 310 into another folded film 320 and produces a multi-layer composition 330. As illustrated, the folded film 310 can comprise a folded edge 312, an open edge 314, a first half 316, and a second half 318. Similarly, the folded film 320 can comprise a folded edge 322, an open edge 324, a first half 326, and a second half 328. Thus, as shown, each of the folded films 310, 320 can comprise a "c," "j," or "u" configuration. As such, the folded films 310, 320 may be referred to herein as c-folded, j-folded films, or u-folded films. C-folded films can comprise films that are symmetrical about their folded edge, while j- or u-folded films can comprise films that are not symmetrical about their folded edge (i.e., one of the halves extend farther than the other).

FIG. 21 also depicts the resulting multi-layer composite folded film or also called herein a film assembly of a first folded film layer within a second folded film layer 330. The resulting multi-layer composite folded film or film assembly 330 is comprised of folded film 310, which is inserted within folded film 320. In particular, the folded film 310 lies between the first half 326 and the half 328 of folded film 320. The resulting multi-layer composite folded film 330 has a folded edge 332 and an open edge 334. The folded edges 312 and 322 of folded films 310 and 320 coincide with the folded edge 332 of the resulting multi-layer composite folded film or film assembly 330. Correspondingly, the open edges 314 and 324 of folded films 310 and 320 coincide with the open edge 334 of the resultant multi-layer composite folded film 330.

As explained in greater detail below, the folded film insertion processes can produce a multi-layer composite folded film that may comprise properties of both folded film 310 and folded film 320. Such combination of properties of two composed folded films may have beneficial effects in the resulting composite and for products, such as trash or food bags, which are manufactured with the composite folded films. Additionally, the processes and apparatus disclosed herein may provide benefits in the manufacturing process for producing a composite folded film by reducing the time, floor space, and complexity of inserting one folded film into another folded film. The reduction in the time, floor space, and complexity for inserting one folded film into another folded film, in turn, can result in efficiencies and cost savings for the production of films and products.

To produce the multi-layer composite folded film 330, a manufacturer can advance the folded film 320 in a first direction of travel 336. In one or more implementations the first direction of travel 336 may be parallel to a machine direction, or in other words, the direction in which the folded film 320 was extruded. While traveling in the first direction of travel 336, the manufacturer can separate the first half 26 from the second half 328 of the folded film 320. For example, the folded film 320 can pass about a spreader bar 338. The spreader bar 338 can open the folded film 320. For example, FIG. 21 illustrates that the spreader bar 338 can separate the first half 326 from the second half 328 of the folded film 320, thereby creating a space between the first and second halves 326, 328. In particular, the first half 326 of the folded film 320 can pass on one side of the spreader bar 338 and the second half 326 of the folded film 320 can pass on an opposing side of the spreader bar 338.

The spreader bar 338 can be made of cast and/or machined metal, such as, steel, aluminum, or any other suitable material. Optionally, the spreader bar 338 can be coated with a material such as a rubber or urethane. Still further, the spreader bar 338 can optionally have an air bearing assist or plasma coating to reduce friction. The spreader bar 338 can extend in a direction 340. In one or more implementations, the direction 340 can be transverse or perpendicular to the first direction of travel 336. Thus, in one or more implementations the spreader bar 338 can extend in a direction transverse to the machine direction. The spreader bar 338 can have any configuration that allows for separating of the first and second halves 326, 338 of the folded film 320. For instance, as shown by FIG. 21 the spreader bar 338 can have tapered leading edge. In alternative implementations, the spreader bar 338 can have a cylindrical or other shape.

FIG. 21 further illustrates that a manufacturer can advance the folded film 310 in a second direction of travel 342. The second direction of travel 342 can be non-parallel to the first direction of travel 336. For example, in one or more implementations the second direction of travel 342 can be transverse or perpendicular to the first direction of travel 336. The manufacturer can further insert the folded film 310 between the separated halves 326, 328 of folded film 320. For example, the manufacturer can advance the folded film 310 in the second direction of travel 342 between the first half 326 and the second half 328 of folded film 320.

Once within the folded film 320, the manufacturer can redirect the folded film 310 from the second direction of travel 342 to the first direction of travel 336. In particular, the folded film 310 can change directions from the second direction of travel 342 to the first direction of travel 336 while between the first and second layers 326, 328 of the folded film 320. For example, the folded film 310 can pass about a direction change bar or roller 344. The direction change bar 344 can change the direction of travel of the folded film 310. More specifically, the folded film 310 can pass initially on a first side of the direction change bar 344 and then pass about the direction change bar 344 so the folded film 310 leaves a second opposing side of the direction change bar 344.

One will appreciate in light of the disclosure herein that the direction change bar 344 can comprise a number of different configurations. For example, FIG. 21 illustrates that the direction change bar 344 can comprise a cylinder. In alternative implementations, the direction change bar 344 may be a flat bar with a tapered edge, or may be a roller with a rolling direction to accommodate the direction of travel of folded film 310. Thus, in the implementation shown in FIG. 21, the direction change bar 344 can rotate in a clockwise direction. The direction change bar 344 can be made of cast and/or machined metal, such as, steel, aluminum, or any other suitable material. Optionally, the direction change bar 344 can be coated with a material such as a rubber or urethane. Still further, the direction change bar 344 can optionally have an air bearing assist or plasma coating to reduce friction.

FIG. 21 illustrates that the direction change bar 344 can reside in plane with the spreader bar 338. The in-plane configuration of the spreader bar 338 and the direction change bar 344 can allow the direction change bar 344 to change the direction of the folded film 310 while within the folded film 320. FIG. 21 further illustrates that the direction change bar 344 can extend in a direction 346. The direction 346 can extend at an acute angle relative to direction 340. For example, the direction 346 can extend at an angle of 45 degrees relative to direction 340. In other words, the direction change bar 344 can extend at an angle of 45 degrees relative to the spreader bar 338. Thus, as folded film 310 passes over direction change bar 344, direction change bar 344 can effect a change in direction of travel of folded film 310 of 90 degrees. In other words, after passing about the direction change bar 344, folded film 310 can travel in a direction perpendicular to the second direction of travel 342.

After folded film 310 passes over direction change bar 344, folded film 310 is then situated between the first and second layers 326, 328 of folded film 320 (i.e., folded film 310 has been inserted into folded film 320) resulting in multi-layer composite folded film 330. As previously mentioned, multi-layer composite folded film 30 has a folded edge 332 and an open edge 334. The folded edges 312 and 322 of folded films 310, 320 coincide with the folded edge 332 of the resulting multi-layer composite folded film 330. Correspondingly, the open edges 314 and 324 of folded films 310, 320 coincide with the open edge 334 of the resultant multi-layer composite folded film 330.

One or more implementations can further include an applicator that applies an additive to one or more of the halves 316, 318, 326, 328 of the folded films 310, 320. For example, FIG. 21 illustrates that the spreader bar 338 can have an integrated applicator. The integrated applicator can include a plurality of openings 348 that dispense or spray an additive on the inside surface of the folded film 320 as the folded film 320 passes about the spreader bar 338. As explained in greater detail below, in alternative implementations a separate applicator can reside between the spreader bar 338 and the direction change bar 344.

In any event, the applicator can apply an additive to one or more of the folded films 310, 320. Such additives can comprise glues, adhesives, oils, fragrances, or other additives. For example, in one or more implementations the applicator can apply glue or another adhesive to the inner surface of folded film 320 and/or the outer surface of folded film 310. The glue can then adhere or laminate the inner surface of the folded film 320 to the outer surface of the folded film 310 after the folded film 310 is inserted within the folded film 320.

FIG. 21 illustrates a c-folded film 310 being inserted within another c-folded film 320. In one or more implementations the process and apparatus described in relation to FIG. 21 can be duplicated to combine three or more folded films or one or more folded films with one or more mono-layered film. For example, in one or more implementations another spreader bar similar to the spreader bar 338 can separate the first halves 316, 326 from the second halves 318, 328 of the multi-layer composite folded film 330. A manufacturer can then direct an additional film (either a mono-layer film or another folded film) in the second direction of travel 342. The process can then include inserting the additional film between the first halves 316, 326 and the second halves 318, 328 of the folded films 310, 320. Once within the first and second halves, the process can include redirecting the third film from the second direction of travel 342 into the first direction of travel 336. In particular, the third film can pass about a direction change bar similar to direction change bar 344.

In addition to the foregoing, one or more implementations can further include abutting the folded edge 312 of the folded film 310 against the folded edge 322 of the folded film 320. For example, FIG. 21 shows that once the folded film 310 is inserted within the folded film 320, the manufacturer can separate the first half 316 from the second half 318 of the folded film 310. For example, the folded film 310 can pass about a crease bar 345. The crease bar 345 can open the folded film 310. For example, FIG. 21 illustrates that the crease bar 345 can separate the first half 316 from the second half 318 of the folded film 310, thereby creating a space between the first and second halves 316, 318. In particular, the first half 316 of the folded film 310 can pass on one side of the crease bar 345 and the second half 316 of the folded film 310 can pass on an opposing side of the crease bar 345.

The crease bar 345 can be made of cast and/or machined metal, such as, steel, aluminum, or any other suitable material. Optionally, the crease bar 345 can be coated with a material such as a rubber or urethane. Still further, the crease bar 345 can optionally have an air bearing assist or plasma coating to reduce friction. The crease bar 345 can extend in a direction 340. The crease bar 45 can have any configuration that allows for separating of the first and second halves 316, 318 of the folded film 310. For instance, as shown by FIG. 21, the crease bar 345 can have tapered leading edge. In alternative implementations, the crease bar 345 can have a cylindrical or other shape.

The end of the crease bar 345 can include a wheel 347. In one or more implementations an arm 349 can position the wheel 347 down line from the crease bar 345. In alternative implementations, the wheel 347 can be in line with the crease bar 345 or on a separate bar down line from the crease bar 345. In any event, the wheel 347 can reside between the first and second halves 316, 318 of the folded film 310 separated by the crease bar 345. The wheel 347 can rotate and urge the folded edge 312 of the folded film 310 toward the folded edge 322 of the folded film 320. For example, in one or more implementations the wheel 347 can push or otherwise position the folded edge 312 of the folded film 310 against the folded edge 322 of the folded film 320.

Optionally, the wheel 347 can be coated with a material such as a rubber or urethane. Still further, the wheel 347 can optionally have an air bearing assist or plasma coating to reduce friction. In one or more implementations the wheel 347 can be configured to ensure that it does not rip or otherwise tear either of the folded films 310, 329. For example, the wheel 347 can be spring-loaded. Alternatively, or additionally, sensors can monitor the force the wheel 347 exerts on the folded films 310, 320. An actuator can automatically adjust one or more of the position of the wheel 347, the speed of the wheel 347, or other parameters to in response to the sensors to reduce the likelihood or prevent the wheel 347 from damaging the films.

FIG. 21 depicts an implementation wherein folded film 310 and folded film 320 arrive at the process and apparatus in perpendicular directions. In order to reduce manufacturing space, in one or more implementations folded film 310 and folded film 320 can arrive in directions other than perpendicular directions. For example, FIG. 22 illustrates an apparatus and method for inserting a folded film within another folded film in which the folded films 310, 320 both begin the process by advancing in the first direction of travel 336.

Figure 22:
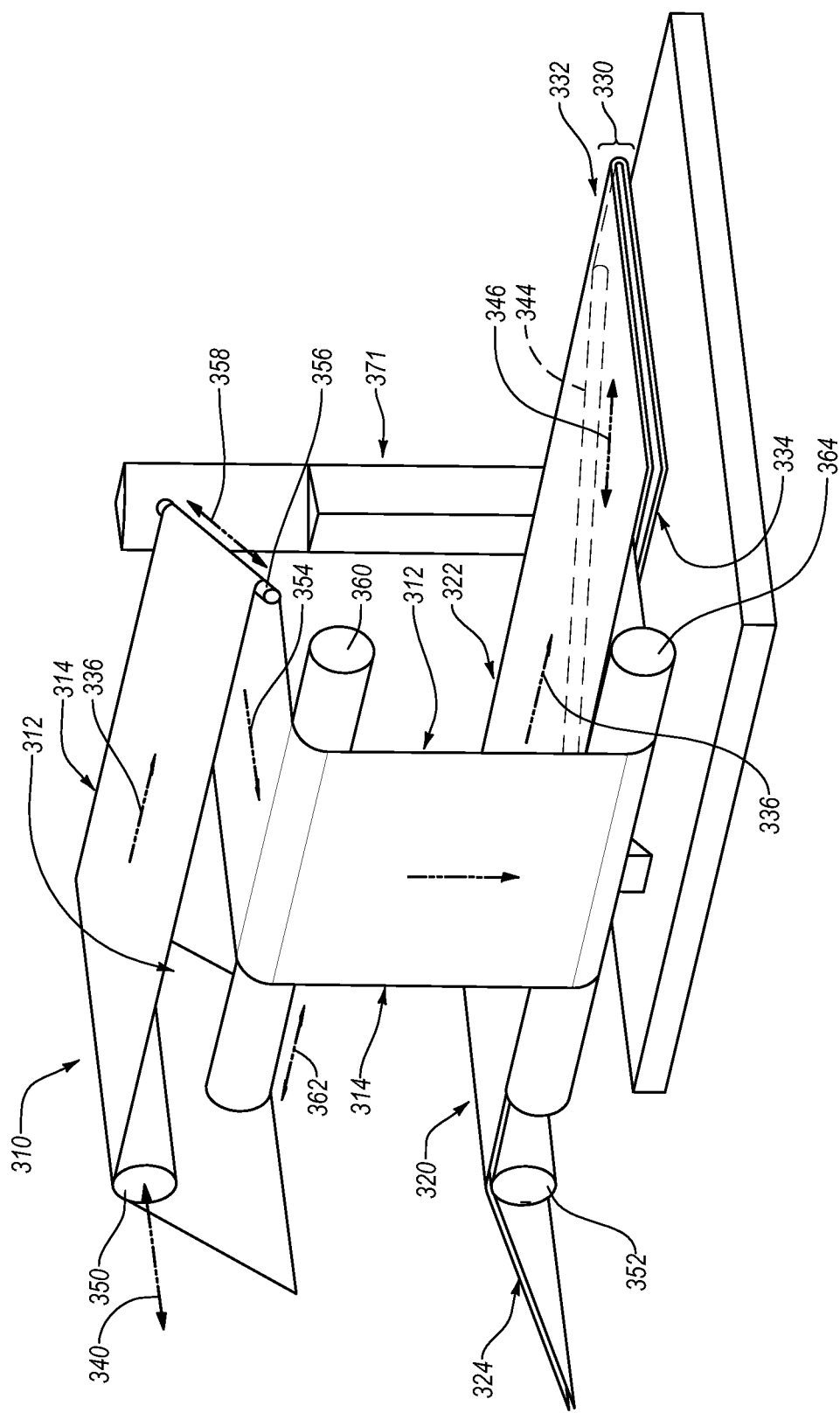
FIG. 22 illustrates another process and apparatus for inserting a folded film into another folded film in accordance with an implementation of the present invention.

As shown by FIG. 22, a guide roller 350 can direct the folded film 310 in the first direction of travel 336. Similarly, an additional guide roller 352 can direct the folded film 320 in the first direction of travel 336. Each of the guide rollers 350, 352 can extend in direction 340. The guide rollers 350, 352 can each have a generally cylindrical shape. The guide rollers 350 and 352 may be made of cast and/or machined metal, such as, steel, aluminum, or any other suitable material. The rollers 350 and 352 can rotate in a corresponding direction about parallel axes of rotation.

Guide roller 350, and thus folded film 310, can reside out of plane with guide roller 352, and thus folded film 320. For example, FIG. 22 illustrates that guide roller 350 can reside vertically above guide roller 352. One will appreciate that running folded films 310, 320 vertically on top of each other can reduce the foot print of the folded film combining apparatus. In alternative implementations, the guide roller 350, and thus folded film 310, can reside in the same plane with guide roller 352, and thus folded film 320.

After passing from the roller 350, the manufacturer can redirect the folded film 310 from the first direction of travel 336 to a third direction of travel 354. In particular, the folded film 310 can change directions from the first direction of travel 336 to the third direction of travel 354 by passing about a direction change bar or roller 356. The direction change bar 356 can change the direction of travel of the folded film 310 in a manner similar to that of direction change bar 344. Furthermore, direction change bar 356 can have a similar configuration to that of direction change bar 344. More specifically, folded film 310 can pass initially on a first side of the direction change bar 356 and then pass about the direction change bar 356 so folded film 310 leaves a second opposing side of the direction change bar 356.

FIG. 22 illustrates that the direction change bar 356 can reside in plane with the guide roller 350. Furthermore, the direction change bar 356 can reside out of plane with the direction change bar 344. For example, FIG. 22 illustrates that the direction change bar 356 can reside vertically above direction change bar 344.

FIG. 22 further illustrates that the direction change bar 356 can extend in a direction 358. The direction 358 can extend at an acute angle relative to the direction 340. For example, the direction 358 can extend at an angle of 45 degrees relative to the direction 340. In other words, the direction change bar 356 can extend at an angle of 45 degrees relative to the guide roller 350. In one or more implementations, the direction change bar 356 can extend in a direction 358 perpendicular to the direction 346 in which the direction change bar 344 extends. In any event, as folded film 310 passes over direction change bar 356, direction change bar 356 can effect a change in direction of travel of folded film 310 such that folded film 310 after passing about the direction change bar 356 travels in a direction perpendicular to the second direction of travel 336.

One or more orientation rollers can then direct the folded film 310 to the same plane as the folded film 320. For example, FIG. 22 illustrates that an orientation roller 360 can redirect the folded film 310 from a plane to a perpendicular plane. In particular, orientation roller 360 can redirect the folded film 310 from traveling in a horizontal plane to a vertical plane. The orientation roller 360 can extend in a direction 362 perpendicular to direction 340. Additionally, the orientation roller 360 can lie in the same plane as the direction change bar 356.

After passing from the orientation roller 360, the folded film 310 can pass about another orientation roller 364. Orientation roller 364 can redirect the folded film 310 from a plane to a perpendicular plane. In particular, orientation roller 364 can redirect the folded film 310 from traveling in a vertical plane to a horizontal plane. As shown by FIG. 22, orientation roller 364 can direct the folded film 310 into the second direction of travel 342. The orientation roller 364 can extend in direction 362. Additionally, the orientation roller 364 can lie in the same plane as the direction change bar 344.

The manufacturer can then insert the folded film 310 between the separated halves 226, 228 of folded film 320 as described above. Once within the folded film 320, the manufacturer can redirect the folded film 310 from the second direction of travel 342 to the first direction of travel 336. In particular, folded film 310 can pass about the direction change bar or roller 344 as described above. After folded film 310 passes over direction change bar 344, folded film 310 is then situated between the first and second layers 226, 228 of folded film 320 (i.e., folded film 310 has been inserted into folded film 320) resulting in multi-layer composite folded film 230.

As shown by FIG. 22, the folded edge 312 and open edge 314 of folded film 310 can change sides within the apparatus and during the process. As folded film 310 travels in the first direction of travel 336, folded edge 312 is at the "front" of FIG. 22 and open edge 314 is at the "back" of FIG. 22. As folded film 320, on the other hand, travels in the first direction of travel 336, folded edge 322 is at the "back" of FIG. 22 and open edge 324 is at the "front" of FIG. 22. Thus, the folded film 310 and the folded film 320 can enter the apparatus in opposing orientations. By passing about orientation rollers 360, 364 and direction change bar 344, the open edge 314 of folded film 310 can change to the "front" of FIG. 22 and the folded edge 312 can change to the "back" of FIG. 22. As multi-layer composite folded film 330 emerges from the apparatus and process, folded edge 312 of folded film 310 is coincident with folded edge 322 of folded film 320 and open edge 314 of folded film 310 is coincident with open edge 324 of folded film 320.

The system and devices of FIG. 22 do not include the crease bar 345 and wheel 347. One will appreciate in light of the disclosure herein, that the crease bar 345 and wheel 347 can be added to the systems and devices of FIG. 22 and/or any of the other devices, systems, and methods described herein. For example, in one or more implementations the system and devices of FIG. 22 can include a crease bar 345 and wheel 347 positioned down line from the direction change bar 344. Furthermore, while the apparatus FIGS. 21 and 22 are horizontally extending, to save floor space, in one or more embodiments, a manufacturer and vertically orient one or more components.

Figure 23:
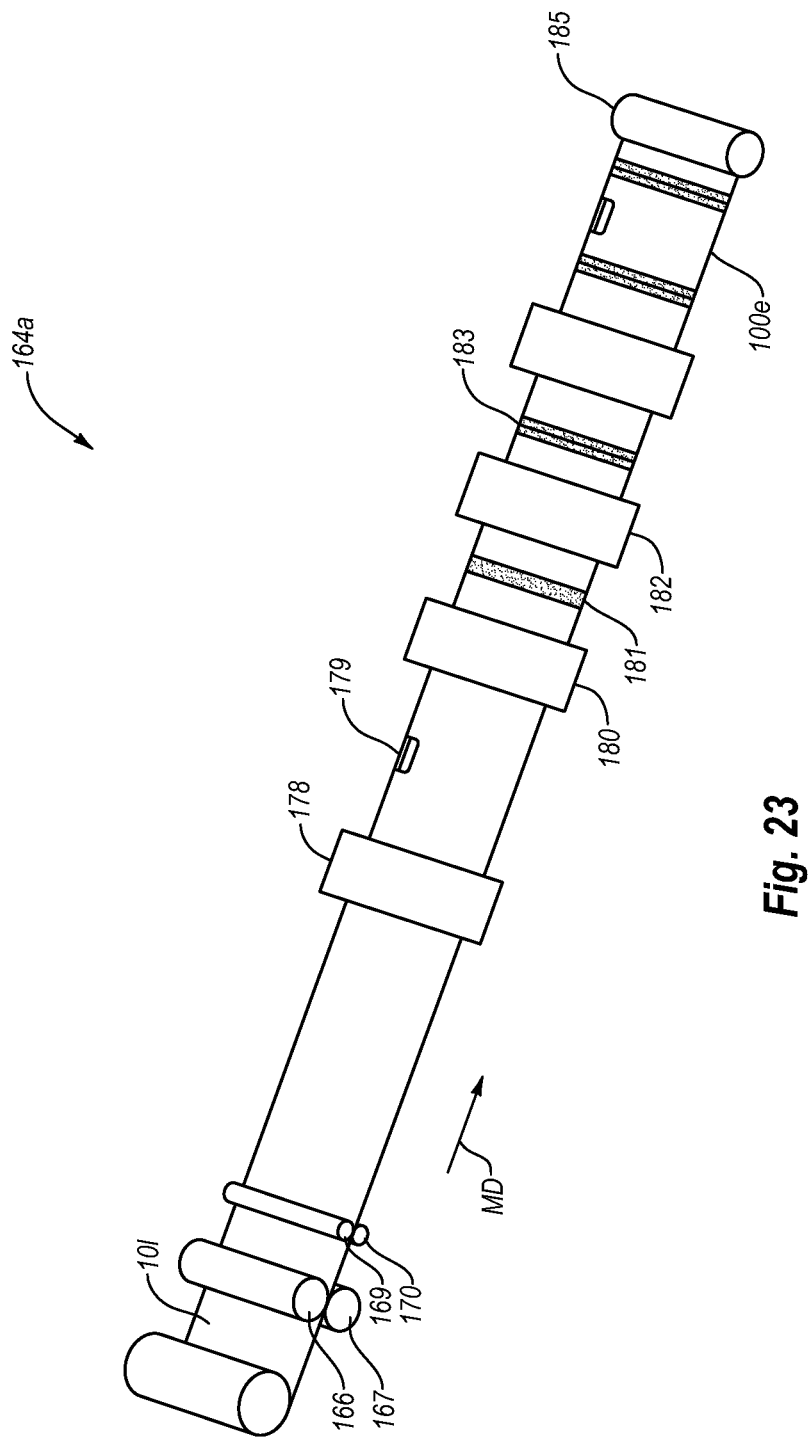
FIG. 23 illustrates a schematic diagram of another bag manufacturing process in accordance with one or more implementations of the present invention.

FIG. 23 illustrates another manufacturing process 164a for producing a plastic bag from a multi-layered lightly-laminated film. The process 164a is similar to process 164 of FIG. 19, except that the film layers 10c, 10d (i.e., film assembly 101) are folded in half to form c-, u-, or j-folded films prior to beginning the process. As shown, according to the process 164a the fold films 101 directed along a machine direction (i.e., the direction in which both films forming the fold films 101 were extruded). The fold films 101 pass between first and second cylindrical intermeshing rollers 166, 167 to incrementally stretch and lightly laminate the initially separate film layers 10c, 10d to create un-bonded regions and bonded regions. The intermeshing rollers 166, 167 have a construction similar to that of intermeshing rollers 12, 14 of FIGS. 1A-1B. In other embodiments, the intermeshing rollers 166, 167 can have the configuration of any of the other intermeshing rollers shown or described herein. As the fold films 101 pass between the first and second rollers 166, 167 the ridges and/or teeth of the intermeshing rollers 166, 167 can form a multi-layered lightly-laminated film. In other words, four layers of film (i.e., two halves of each film folded over) can pass through the intermeshing rollers 166, 167 at the same time. One will appreciate in light of the disclosure herein that the fold of the folded films 101 can be positioned opposite the side in which the draw tape 179 is inserted.

In particular, the intermeshing rollers 166, 167 can incrementally stretch the fold films 101 in the machine direction to form stretched, thinner regions 46. In one or more embodiments both of the films 10c, 10d forming the fold films 101 are predominately oriented in the machine direction. In such embodiments, the intermeshing rollers 167, 168 can further orient the stretched, thinner regions 46 in the machine direction such that the stretched, thinner regions 46 are more oriented in the machine direction that the thicker regions 44 that are un-stretched or less stretched compared to the stretched, thinner regions 46.

As the fold films 101 comprise two layers of film folded in a c, j, or u, the intermeshing rollers 166, 167 can lightly laminated not only the outer film layer to the inner film layer, but can also lightly laminate the two halves of the inner layer together as they are proximate each other (see e.g., FIG. 20D). In such embodiments, after passing through the intermeshing rollers 166, 167, either before or after passing through the nip rollers 169, 170, the fold films 101 can pass over a spreader bar (similar the spreader bar described above in relation to FIG. 21). Passing over the spreader bar can separate the two halves of the fold films 101 and break any bonds between the two halves of the inner layer formed when passing through the intermeshing rollers 166, 167.

As described above in relation to FIG. 19, the process can further involve inserting a draw tape 179 into ends of now incrementally-stretched and lightly laminated films 101. Furthermore, a sealing operation 180 can form the parallel side edges of the finished bag by forming heat seals 181 between adjacent portions of the folded multi-layered lightly-laminated film 10b. The heat seal 181 may strongly bond adjacent layers together in the location of the heat seal 181 so as to tightly seal the edges of the finished bag. The heat seals 181 may be spaced apart along the folded multi-layered lightly-laminated film 10b to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 100e (see e.g., FIG. 15) that may be separated from the multi-layered lightly-laminated film assembly 101. A roll 185 can wind the multi-layered lightly-laminated film 10b embodying the finished bags 184 for packaging and distribution. For example, the roll 185 may be placed into a box or bag for sale to a customer.

In still further implementations, the folded multi-layered lightly-laminated film 10b may be cut into individual bags along the heat seals 181 by a cutting operation. In another implementation, the folded multi-layered lightly-laminated film assembly 101 may be folded one or more times prior to the cutting operation. In yet another implementation, the side sealing operation 180 may be combined with the cutting and/or perforation operations 182.

Figure 24:
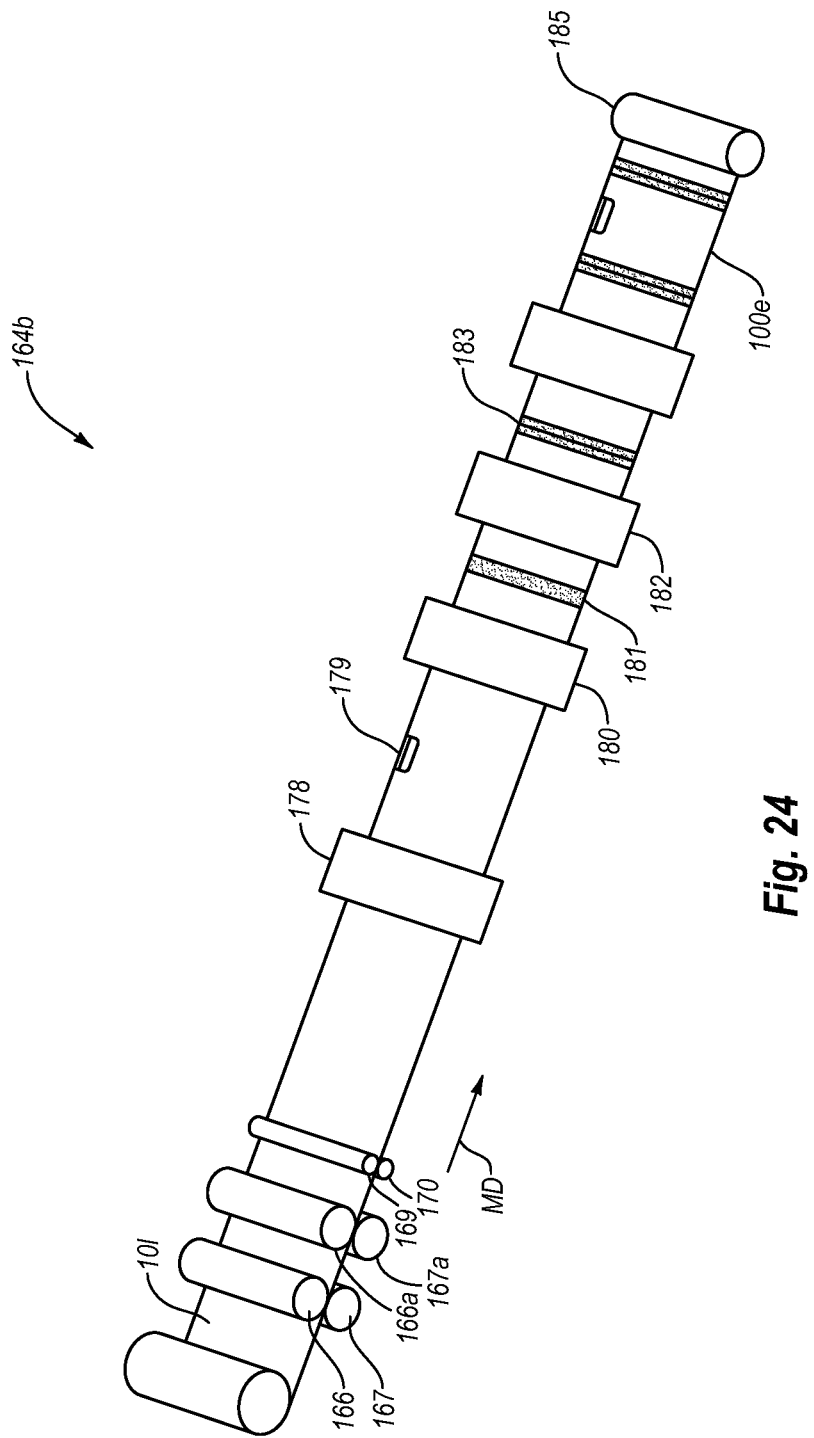
FIG. 24 illustrates a schematic diagram of yet another bag manufacturing process in accordance with one or more implementations of the present invention.

FIG. 24 illustrates another manufacturing process 164b for producing a multi-layered lightly-laminated film and a multi-layered bag (e.g., bag 100f of FIG. 16 or 100h of FIG. 18) therefrom. The process 164b can be similar to process 164a of FIG. 23, except that the fold film assembly 101 can pass through a second set of intermeshing rollers 166a, 167a, respectively, after passing through intermeshing rollers 166, 167. In one or more embodiments, the intermeshing rollers 166a, 167a can comprise SELFing rollers (similar to those described above in relation to FIG. 7). The intermeshing rollers 166a, 167a can further stretch and lightly bond at least a portion of the layers of the folded film assembly 101 together. For example, as described above, the intermeshing rollers 166a, 167a can further stretch the film assembly and form a strainable network in the film assembly. Passing the layers of the film assembly 101 simultaneously together through the pair of SELFing rollers can comprises passing the layers of the film assembly simultaneously together through a pair of SELFing rollers having intermeshing teeth extending along only a portion of a length of each roller so as to only create strainable networks in a portion (e.g., portion 124b of FIG. 16 or portion 116d of FIGS. 17 and 18) of the film assembly 101.

Figure 25:
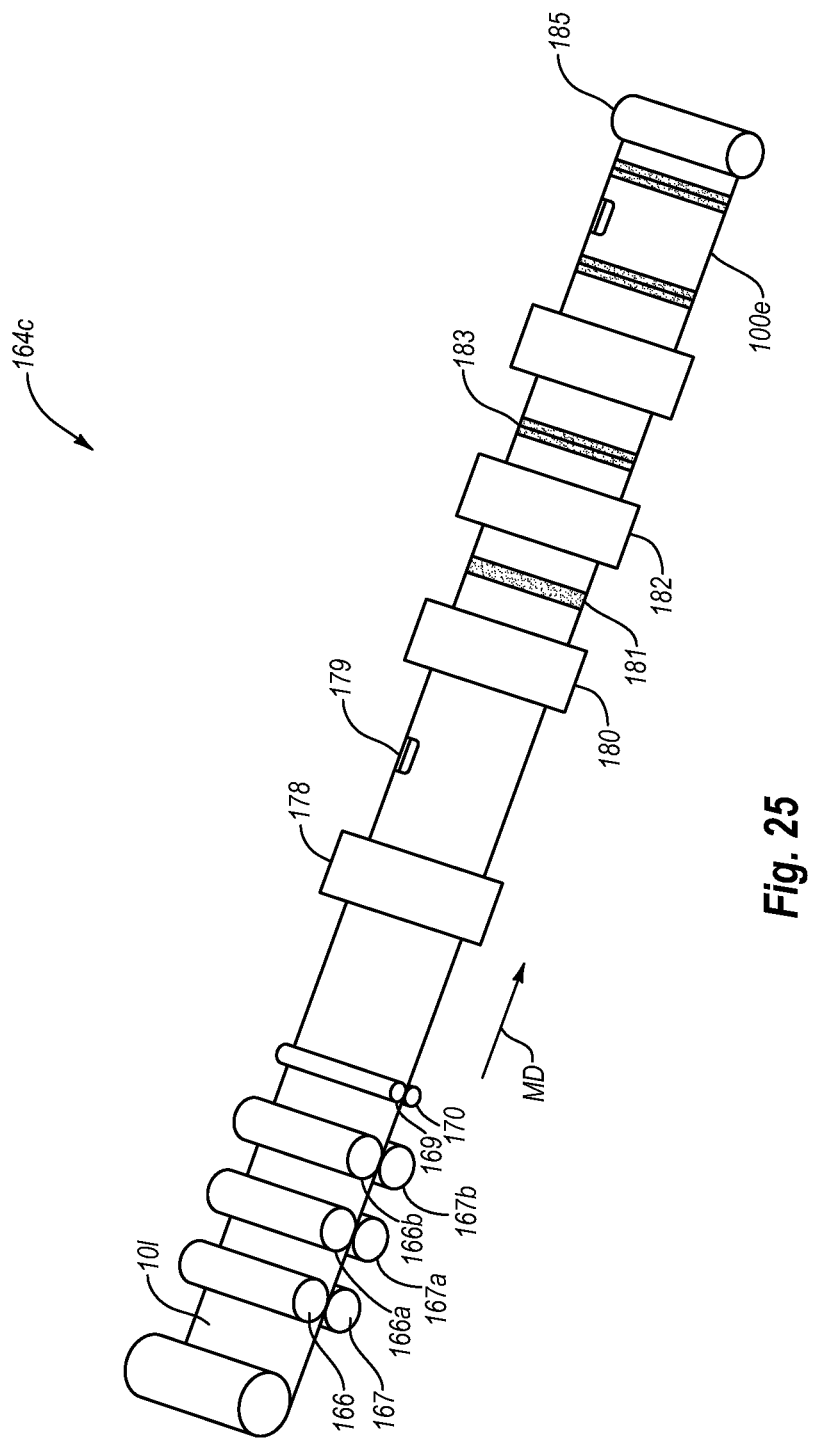
FIG. 25 illustrates a schematic diagram of still another bag manufacturing process in accordance with one or more implementations of the present invention.

FIG. 25 illustrates yet another manufacturing process 164c for producing a multi-layered lightly-laminated film and a multi-layered bag (e.g., bag 100g of FIG. 17) therefrom. The process 164c can be similar to process 164b of FIG. 24, except that the fold film assembly 101 can pass through a third set of intermeshing rollers 166b, 167b, respectively, after passing through intermeshing rollers 166, 167, 166a, 167a. In one or more embodiments, the intermeshing rollers 166b, 167b can comprise TD rollers (similar to those described above in relation to FIGS. 3A-3B). The intermeshing rollers 166b, 167b can further stretch and lightly bond at least a portion of the layers of the folded film assembly 101 together. For example, as described above, the intermeshing rollers 166b, 167b can further stretch the film assembly and form a strainable network in the film assembly. Passing the layers of the film assembly 101 simultaneously together through the pair of SELFing rollers can form machine-direction extending stretched regions, machine-direction extending thicker ribs, and machine-direction extending bonds that secure machine-direction thicker ribs in outer film-layer to machine-direction thicker ribs in the inner film-layer.

I. EXAMPLES

Multi-layered lightly-laminated films according to one or more implementations of the present invention were formed according to various ring rolling processes. Table I below lists various discontinuously laminated films and comparative films that were tested. Table II lists the physical properties of the films of Table I. The results recorded in Table II indicate that the bi-layer films that were lightly bonded together with discontinuous lamination exhibit significantly improved strength properties, such as the energy to maximum load (Dynatup Max), which relates to impact resistance. The melt index of the layers of the films was determined under ASTM D-1238, Condition E. It is measured at 190° C. and 2.16 kilograms and reported as grams per 10 minutes.

TABLE I

Discontinuously Laminated Films

| Film | Layer 1 | Process | Layer 2 | Process | Discontinuous Lamination | Gauge (Mils) |
|---|---|---|---|---|---|---|
| A | LLDPE | | | | | 0.40 |
| B | LDPE | | | | | 0.40 |
| C | HDPE | | | | | 0.40 |
| D | LLDPE | | | | Yes | 0.40 |
| E | LDPE | | | | Yes | 0.40 |
| F | HDPE | | | | Yes | 0.40 |
| G | LLDPE | | LLDPE | | Yes | 0.80 |
| H | LDPE | | LDPE | | Yes | 0.80 |
| I | HDPE | | HDPE | | Yes | 0.80 |
| J | LLDPE | TD RR | LDPE | TD RR | Yes | 0.80 |
| K | LLDPE | TD RR | HDPE | TD RR | Yes | 0.80 |
| L | LDPE | TD RR | HDPE | TD RR | Yes | 0.80 |
| M | LLDPE | MD RR | LLDPE | TD RR | Yes | 0.80 |
| N | LLDPE | MD RR | LDPE | TD RR | Yes | 0.80 |
| O | LLDPE | MD RR | HDPE | TD RR | Yes | 0.80 |

LLDPE has a density of 0.920 and a Melt Index of 1.000. LDPE has a density of 0.926 and a Melt Index of 0.800. HDPE has a density of 0.959 and a Melt Index of 0.057. TD RR is TD ring rolling at 40 Pitch. MD RR is MD ring rolling at 60 Pitch. Discontinuous Lamination was achieved through SELF'ing at a DOE of 0.038".

TABLE II

Physical Properties

| Film | Tear MD | Tear TD | Yield MD | Yield TD | Peak Load MD | Peak Load TD | Strain@Break MD | Strain@Break TD | Dynatup Energy to max. load |
|---|---|---|---|---|---|---|---|---|---|
| A | 165 | 274 | 0.66 | 0.64 | 3.44 | 1.59 | 532 | 606 | 3.10 |
| B | 72 | 283 | 0.81 | 0.86 | 3.72 | 2.28 | 482 | 660 | 0.25 |
| C | 3 | 314 | 1.74 | 0.86 | 3.83 | 0.89 | 268 | 135 | N.A. |
| D | 181 | 176 | 0.55 | 0.60 | 1.21 | 1.44 | 352 | 557 | 3.20 |
| E | 175 | 197 | 0.70 | 0.75 | 1.46 | 1.21 | 331 | 473 | 1.71 |
| F | 12 | 170 | 0.30 | 3.13 | 1.70 | 0.70 | 115 | 64 | 0.45 |
| G | 372 | 427 | 1.12 | 1.25 | 2.92 | 2.59 | 389 | 551 | 5.81 |
| H | 312 | 375 | 1.39 | 1.54 | 2.83 | 2.39 | 346 | 518 | 3.60 |
| I | 14 | 220 | 1.20 | 0.44 | 2.71 | 1.07 | 112 | 78 | 0.87 |
| J | 392 | 385 | 1.21 | 1.40 | 3.19 | 2.71 | 385 | 540 | 4.15 |
| K | 191 | 292 | 1.75 | 1.27 | 2.62 | 1.53 | 61 | 535 | 3.32 |
| L | 158 | 288 | 2.20 | 1.50 | 3.00 | 1.55 | 252 | 498 | 2.63 |
| M | 539 | 368 | 1.26 | 1.26 | 3.32 | 3.06 | 456 | 401 | 7.19 |
| N | 544 | 383 | 1.27 | 1.69 | 2.18 | 2.91 | 365 | 362 | 6.96 |
| O | 574 | 189 | 1.44 | 3.87 | 1.74 | 3.87 | 404 | 157 | 1.41 |
| Control | 225 | 625 | 1.46 | 1.43 | 6.29 | 4.36 | 476 | 665 | |

Tear in grams.
Yield in Lb$_f$
Peak Load in Lb$_f$
Strain@Break in %
Dynatup Energy to Max in In-Lb$_f$
Control is 0.9 Mil LDPE film As shown in Table III, another set of films was evaluated with different levels of stretch processes with and without discontinuous lamination of adjacent layers. The results show significantly increased values of Dynatup Energy to maximum load as a result of discontinuous lamination.

TABLE III

Additional Examples

| Film | Layer 1 Process | Layer 2 Process | Discontinuous Lamination | Dynatup Energy to max. load | Gauge Initial (mils) | Gauge Final (mils) |
|---|---|---|---|---|---|---|
| P | None | None | Yes | 18.3 | 2.14 | 2.12 |
| Q | MD-1 | TD-1 | No | 7.2 | 2.14 | 1.92 |
| R | MD-1 | TD-1 | Yes | 17.1 | 2.14 | 1.93 |
| S | MD-2 | TD-2 | No | 8.7 | 2.14 | 1.68 |
| T | MD-2 | TD-2 | Yes | 15.3 | 2.14 | 1.63 |
| Base | None | None | No | 5 | 1.07 | 1.07 |

As shown in Table IV, samples of cold processed MD ring rolled (at 0.100" DOE, 0.100" pitch, LDPE film were laminated under a cold ring rolling process to achieve unexpectedly superior tear resistance properties. The MD Tear and the TD Tear resistance values were synergistically enhanced as a result of the discontinuous lamination process. Bond strength could be further increased while still being less than the strength of the weakest layer by addition of a tackifier, an adhesive, corona treatment, etc. to increase tackiness between the layers.

TABLE IV

Ring Rolled Laminates

| Sample | MD Tear | TD Tear |
|---|---|---|
| TD ring rolled laminate of A and B, 21.5 gsm[a] | 429 | 881 |
| A. MD ring rolled, Black top layer[b] | 193 | 580 |
| B. MD ring rolled, White bottom layer[c] | 261 | 603 |
| TD ring rolled laminate of C and D, 18.8 gsm | 314 | 876 |
| C. MD ring rolled, Black top layer[d] | 170 | 392 |
| D. MD ring rolled, Black bottom layer[d] | 151 | 470 |
| TD ring rolled laminate of E and F, 21.1 gsm | 312 | 1018 |
| E. MD ring rolled, Black top layer[b] | 218 | 765 |
| F. MD ring rolled, Black bottom layer[d] | 170 | 387 |

[a]TD ring rolling was 0.040" pitch tooling run at 0.020" DOE. The A and B webs were simultaneously run first through the MD and then the TD tooling.
[b]14 gsm 3 ply coextruded black layer with outer skin plies containing 30% DOW Affinity™ 8100 and 2% talc, processed at blowup ratio A and MD ring rolled. MD ring rolling was 0.100" pitch tooling run at 0.100" DOE.
[c]14 gsm 3 ply coextruded white layer with 2% slip agent in outer skin plies, processed at blowup ratio 1.5A and MD ring rolled at 0.100" pitch tooling run at 0.100" DOE.
[d]14 gsm 3 ply coextruded black layer with outer skin plies containing 30% DOW Affinity™ 8100 and 2% talc, processed at blowup ratio 1.5A and MD ring rolled at 0.100" pitch tooling run at 0.100" DOE.

The MD and TD tear values shown in Table IV, show how the MD tear value is significantly increased relative to the MD tear value of the individual layers. The data shows an additive or synergistic effect in both MD and TD tears resistance. Such results are particularly surprising and advantageous, as when the two layers are tightly laminated together (e.g., co-extruded), the strength of the composite film typically reverts to the have a strength approximately equal to that of the weakest layer. Thus, the light, discontinuous lamination of adjacent layers into a multi-layer film provides significant increases in strength.

In addition to allowing for films with less raw material yet enhanced strength parameters, the results from Table VI further show that multi-layered lightly-laminated films of one or more implementations can have an increased gauge (i.e., caliper) despite the reduction in basis weight. Some consumers may associate thinner films with decreased strength. Indeed, such consumers may feel that they are receiving less value for their money when purchasing thermoplastic film products with smaller gauges. One will appreciate in light of the disclosure herein that despite a reduction in raw material, multi-layered lightly-laminated films of one or more implementations may be and look thicker than a single layer of film with a higher basis weight. Thus, one or more implementations can enhance the look and feel of a film in addition to enhancing the strength parameters of the film.

The present invention may be embodied in other specific forms without departing from its spirit or essential characteristics. For example, the illustrated and described implementations involve non-continuous (i.e., discontinuous or partially discontinuous lamination) to provide the light bonds. In alternative implementations, the lamination may be continuous. For example, multi film layers could be co-extruded so that the layers have a bond strength that provides for delamination prior to film failure to provide similar benefits to those described above. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for forming a multi-layered incrementally-stretched and incrementally-laminated bag, the method comprising:
    creating a film assembly of a folded inner film-layer within a folded outer film-layer;
    incrementally stretching and incrementally bonding adjacent layers of the film assembly together by passing the film assembly through a pair of intermeshing rollers;
    incrementally heat sealing the incrementally stretched and incrementally bonded film assembly; and
    perforating the incremental heat seals of the incrementally stretched and incrementally bonded film assembly to define bags.

2. The method as recited in claim 1, wherein passing the film assembly through a pair of intermeshing rollers comprises passing the film assembly through a pair of machine-direction ring rollers.

3. The method as recited in claim 2, wherein incrementally stretching and incrementally bonding adjacent layers of the film assembly together comprises incrementally stretching the film assembly in the machine direction to form transverse-direction extending stretched regions and transverse-direction extending thicker ribs.

4. The method as recited in claim 3, wherein incrementally stretching and incrementally bonding adjacent layers of the film assembly together further comprises forming transverse-direction extending bonds securing transverse-direction thicker ribs in the outer film-layer to transverse-direction thicker ribs in the inner film-layer.

5. The method as recited in claim 4, wherein the inner film-layer and the outer film-layer are both predominately oriented in the machine direction.

6. The method as recited in claim 5, further comprising orienting the transverse-direction extending stretched regions further in the machine direction such that the transverse-direction extending stretched regions are more oriented in the machine direction than the transverse-direction thicker ribs.

7. The method as recited in claim 4, further comprising breaking bonds between folded halves of the inner film-layer of the film assembly by passing a spreader bar between the folded halves of the inner film-layer of the film assembly.

8. The method as recited in claim 4, further comprising forming a strainable network in at least a portion of the film assembly by passing the film assembly through a second pair of intermeshing rollers.

9. The method as recited in claim 8, wherein forming a strainable network in at least a portion of the film assembly forming a strainable network only in a middle portion of the film assembly.

10. The method as recited in claim 9, further comprising:
 inserting a draw-tape between the inner film-layer and the outer film-layer; and
 forming a hem seal between the draw tape and the middle portion of the film including the strainable network.

11. A method for forming a multi-layered incrementally-stretched and incrementally-laminated bag, the method comprising:
 placing a folded inner film-layer within a folded outer film-layer to create a film assembly having four layers;
 passing the four layers of the film assembly simultaneously together through a pair of machine-direction intermeshing rollers to form transverse-direction extending stretched regions, transverse-direction extending thicker ribs, and transverse-direction extending bonds that secure transverse-direction thicker ribs in outer film-layer to transverse-direction thicker ribs in the inner film-layer; and
 forming the film assembly into one or more bags.

12. The method as recited in claim 11, further comprising passing the four layers of the film assembly simultaneously together through a pair of SELFing rollers to further stretch the film assembly and form a strainable network in the film assembly.

13. The method as recited in claim 12, wherein passing the four layers of the film assembly simultaneously together through the pair of SELFing rollers comprises passing the four layers of the film assembly simultaneously together through a pair of SELFing rollers having intermeshing teeth extending along only a portion of a length of each roller.

14. The method as recited in claim 13, further comprising passing the four layers of the film assembly simultaneously together through a pair of transverse-direction ring rollers to form machine-direction extending stretched regions, machine-direction extending thicker ribs, and machine-direction extending bonds that secure machine-direction thicker ribs in the outer film-layer to machine-direction thicker ribs in the inner film-layer.

15. The method as recited in claim 12, wherein the four layers of the film assembly consist of a first portion of the outer film-layer, a first portion of the inner film-layer, a second portion of the inner film-layer, and a second portion of the outer film-layer.

16. The method as recited in claim 15, wherein passing the four layers of the film assembly simultaneously together through the pair of machine-direction intermeshing rollers further form transverse-direction extending bonds that secure transverse-direction thicker ribs in the first portion of the inner film-layer to transverse-direction thicker ribs in the second portion of the inner film-layer.

17. The method as recited in claim 16, further comprising breaking the transverse-direction extending bonds that secure transverse-direction thicker ribs in the first portion of the inner film-layer to transverse-direction thicker ribs in the second portion of the inner film-layer without breaking the transverse-direction extending bonds that secure transverse-direction thicker ribs in outer film-layer to transverse-direction thicker ribs in the inner film-layer by passing a spreader bar between the first portion of the inner film-layer and the second portion of the inner film-layer.

18. The method as recited in claim 13, wherein the inner film-layer and the outer film-layer are both predominately oriented in the machine direction.

19. The method as recited in claim 18, further comprising orienting the transverse-direction extending stretched regions further in the machine direction such that the transverse-direction extending stretched regions are more oriented in the machine direction than the transverse-direction thicker ribs.

20. A method for forming a multi-layered incrementally-stretched and incrementally-laminated bag, the method comprising:
 placing a folded inner film-layer within a folded outer film-layer to create a film assembly having four layers;
 passing the four layers of the film assembly simultaneously together through a pair of machine-direction intermeshing rollers to form transverse-direction extending stretched regions, transverse-direction extending thicker ribs, and transverse-direction extending bonds that secure transverse-direction thicker ribs in the outer film-layer to transverse-direction thicker ribs in the inner film-layer;
 passing the four layers of the film assembly simultaneously together through a pair of SELFing rollers to further stretch only a portion of the film assembly and form a strainable network in only the further stretched portion of the film assembly; and
 forming the film assembly into one or more bags.

* * * * *